(12) United States Patent  
Yasumura

(10) Patent No.: US 7,301,785 B2  
(45) Date of Patent: Nov. 27, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/338,280

(22) Filed: Jan. 24, 2006

(65) Prior Publication Data

US 2006/0187687 A1   Aug. 24, 2006

(30) Foreign Application Priority Data

Jan. 25, 2005   (JP) .............................. 2005-016758

(51) Int. Cl.
*H02M 3/335*   (2006.01)

(52) U.S. Cl. .................... 363/21.02; 363/131

(58) Field of Classification Search ............. 363/20, 363/21.01, 21.02, 21.04, 21.08, 95, 97, 131
See application file for complete search history.

(56) References Cited

U.S. PATENT DOCUMENTS

| | | | |
|---|---|---|---|
| 4,128,868 A | 12/1978 | Gamble | |
| 5,274,543 A | 12/1993 | Loftus, Jr. | |
| 6,285,567 B1 | 9/2001 | Kennedy | |
| 6,310,792 B1 | 10/2001 | Drobnik | |
| 6,366,476 B1 * | 4/2002 | Yasumura | 363/21.02 |
| 6,483,721 B2 | 11/2002 | Terashi et al. | |
| 6,515,875 B2 * | 2/2003 | Yasumura | 363/21.02 |
| 6,583,999 B1 | 6/2003 | Spindler et al. | |
| 6,654,259 B2 | 11/2003 | Koshita et al. | |
| 6,687,137 B1 * | 2/2004 | Yasumura | 363/21.01 |
| 6,831,846 B2 * | 12/2004 | Yasumura | 363/21.02 |
| 6,930,893 B2 | 8/2005 | Vinciarelli | |
| 6,934,167 B2 | 8/2005 | Jang et al. | |
| 7,054,167 B2 * | 5/2006 | Yasumura | 363/16 |

FOREIGN PATENT DOCUMENTS

| | | |
|---|---|---|
| JP | 06-3276246 A | 11/1994 |
| JP | 2000-134925 A | 5/2000 |
| JP | 2000-152617 A | 5/2000 |
| JP | 2003-235259 A | 8/2003 |
| JP | 2004-194105 A | 7/2004 |

* cited by examiner

*Primary Examiner*—Adolf Berhane
(74) *Attorney, Agent, or Firm*—Lerner, David, Littenberg, Krumholz & Mentlik, LLP

(57) ABSTRACT

An abnormal operation in which a current flows through a switching device before the end of an off period of the switching device at medium load is eliminated by setting the coupling coefficient of an isolated converter transformer to about 0.7 or lower. A primary side parallel resonance frequency and a secondary side series resonance frequency are set so as to obtain favorable power conversion efficiency characteristics.

5 Claims, 11 Drawing Sheets

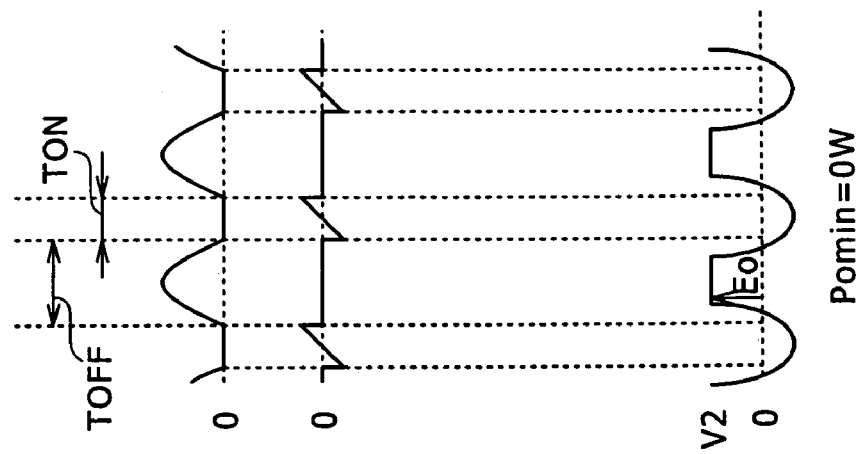
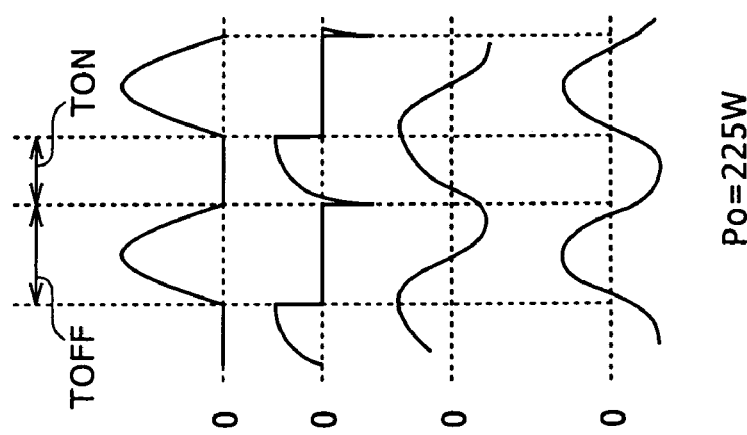
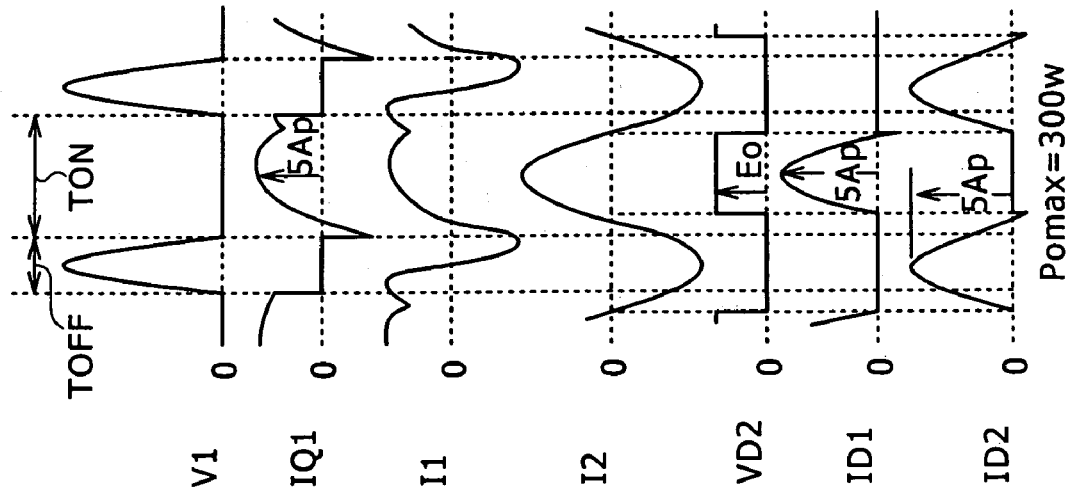

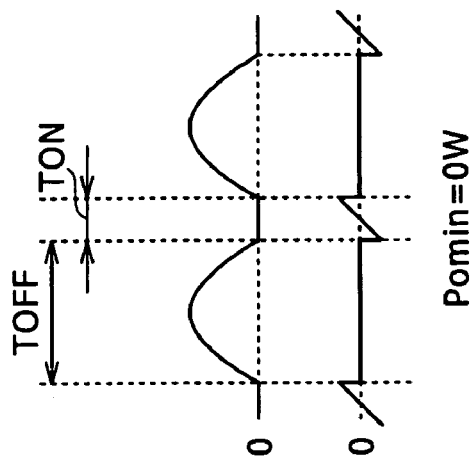
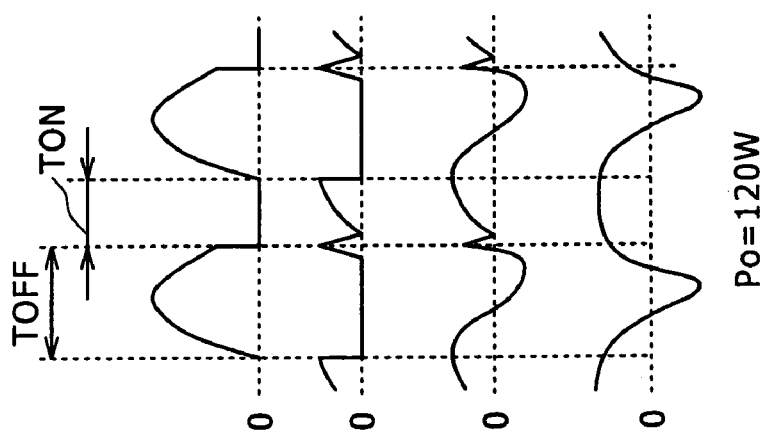
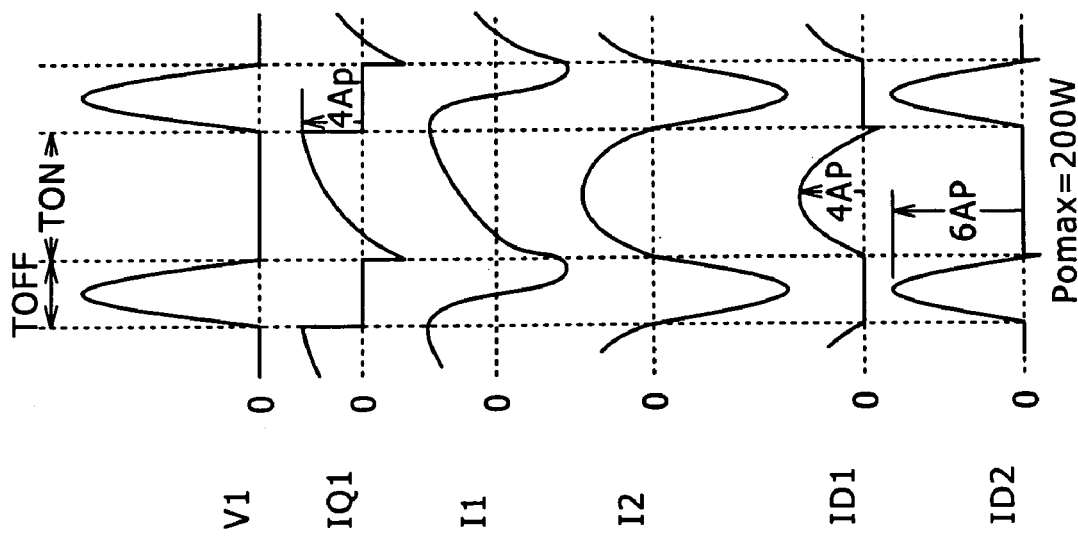

SWITCHING POWER SUPPLY CIRCUIT

CROSS-REFERENCE TO RELATED APPLICATIONS

The present application claims priority from Japanese Patent Application No. JP 2005-016758 filed on Jan. 25, 2005, the disclosure of which is hereby incorporated by reference herein.

BACKGROUND OF THE INVENTION

The present invention relates to a switching power supply circuit including a voltage resonant converter.

As so-called soft-switching power supply of a resonant type, a current resonant type and a voltage resonant type are widely known. In a present situation, a current resonant converter having two switching devices coupled by a half-bridge coupling system is in wide use because such a current resonant converter is easily put to practical use.

However, the characteristics of a high withstand voltage switching device, for example, are now being improved, and therefore the problem of withstand voltage in putting a voltage resonant converter to practical use is being cleared up. In addition, a voltage resonant converter formed by a single-ended system with one switching device is known to be advantageous as compared with a current resonant forward converter having one switching device in terms of input feedback noise, the noise component of a direct-current output voltage line, and the like.

FIG. 8 shows an example of configuration of a switching power supply circuit including a voltage resonant converter of the single-ended system.

In the switching power supply circuit shown in FIG. 8, a rectifying and smoothing circuit formed by a bridge rectifier circuit Di and a smoothing capacitor Ci rectifies and smoothes an alternating input voltage VAC, and thereby generates a rectified and smoothed voltage Ei as a voltage across the smoothing capacitor Ci.

Incidentally, a noise filter formed by a set of common mode choke coils CMC and two across capacitors CL and removing common-mode noise is provided in the line of an alternating-current power supply AC.

The rectified and smoothed voltage Ei is input as a direct-current input voltage to the voltage resonant converter. As described above, the voltage resonant converter employs the single-ended system with one switching device Q1. The voltage resonant converter in this case is an externally excited converter. The MOS-FET switching device Q1 is switching-driven by an oscillation and drive circuit 2.

A MOS-FET body diode DD is connected in parallel with the switching device Q1. A primary-side parallel resonant capacitor Cr is connected in parallel with the source and drain of the switching device Q1.

The primary-side parallel resonant capacitor Cr forms a primary side parallel resonant circuit (voltage resonant circuit) in conjunction with the leakage inductance L1 of a primary winding N1 of an isolated converter transformer PIT. This primary side parallel resonant circuit provides a voltage resonant operation as the switching operation of the switching device Q1.

The oscillation and drive circuit 2 applies a gate voltage as a drive signal to the gate of the switching device Q1 to switching-drive the switching device Q1. Thus the switching device Q1 performs switching operation at a switching frequency corresponding to the cycle of the drive signal.

The isolated converter transformer PIT transmits the switching output of the switching device Q1 to a secondary side.

The isolated converter transformer PIT has for example an EE type core formed by combining E-type cores of ferrite material with each other. A winding part is divided into a primary side winding part and a secondary side winding part. The primary winding N1 and a secondary winding N2 are wound around the central magnetic leg of the EE type core.

In addition, a gap of about 1.0 mm is formed in the central magnetic leg of the EE type core of the isolated converter transformer PIT. Thereby a coupling coefficient k=about 0.80 to 0.85 is obtained between the primary side and the secondary side. The coupling coefficient k at this level may be considered to represent loose coupling, and therefore a state of saturation is not easily obtained. The value of the coupling coefficient k is a factor in setting the leakage inductance (L1).

One end of the primary winding N1 of the isolated converter transformer PIT is inserted between the switching device Q1 and the positive electrode terminal of the smoothing capacitor Ci. Thereby, the switching output of the switching device Q1 is transmitted to the primary winding N1. An alternating voltage induced by the primary winding N1 occurs in the secondary winding N2 of the isolated converter transformer PIT.

In this case, a secondary side series resonant capacitor C2 is connected in series with one end of the secondary winding N2. Thus, the leakage inductance L2 of the secondary winding N2 and the capacitance of the secondary side series resonant capacitor C2 form a secondary side series resonant circuit (current resonant circuit).

In addition, a voltage doubler half-wave rectifier circuit is formed by connecting rectifier diodes Do1 and Do2 and a smoothing capacitor Co to the secondary side series resonant circuit as shown in the figure. This voltage doubler half-wave rectifier circuit generates a secondary side direct-current output voltage Eo having a level corresponding to twice the alternating voltage V2 induced in the secondary winding N2 as a voltage across the smoothing capacitor Co. The secondary side direct-current output voltage Eo is supplied to a load, and is also input to a control circuit 1 as a detection voltage for constant-voltage control.

The control circuit 1 inputs a detection output obtained by detecting the level of the secondary side direct-current output voltage Eo input as the detection voltage to an oscillation and drive circuit 2.

The oscillation and drive circuit 2 controls the switching operation of the switching device Q1 according to the level of the secondary side direct-current output voltage Eo which level is indicated by the detection output input to the oscillation and drive circuit 2 so as to make the secondary side direct-current output voltage Eo constant at a predetermined level. That is, the oscillation and drive circuit 2 generates and outputs a drive signal for controlling the switching operation. Thereby control is performed to stabilize the secondary side direct-current output voltage Eo.

FIGS. 9A, 9B, and 9C and FIG. 10 show results of experiments on the power supply circuit having the configuration shown in FIG. 8. In conducting the experiments, principal parts of the power supply circuit of FIG. 8 are set as follows.

For the isolated converter transformer PIT, an EER-35 core is selected, and the gap of the central magnetic leg is set to a gap length of 1 mm. As for the respective numbers of turns of the primary winding N1 and the secondary winding N2, N1=39 T and N2=23 T. As for the coupling coefficient k of the isolated converter transformer PIT, k=0.81 is set.

The primary-side parallel resonant capacitor Cr=3900 pF and the secondary side series resonant capacitor C2=0.1 μF. are selected. Accordingly, the resonant frequency fo1=230 kHz of the primary side parallel resonant circuit and the resonant frequency fo2=82 kHz of the secondary side series resonant circuit are set. In this case, a relation between the resonant frequencies fo1 and fo2 can be expressed as fo1≈2.8×fo2.

The rated level of the secondary side direct-current output voltage Eo is 135 V. Load power handled by the power supply circuit is in a range of maximum load power Pomax=200 W to minimum load power Pomin=0 W.

FIGS. 9A, 9B, and 9C are waveform charts showing the operations of principal parts in the power supply circuit shown in FIG. 8 on the basis of the switching cycle of the switching device Q1. FIG. 9A shows a voltage V1, a switching current IQ1, a primary winding current I1, a secondary winding current I2, and secondary side rectified currents ID1 and ID2 at the maximum load power Pomax=200 W. FIG. 9B shows the voltage V1, the switching current IQ1, the primary winding current I1, and the secondary winding current I2 at a medium load power Po=120 W. FIG. 9C shows the voltage V1 and the switching current IQ1 at the minimum load power Pomin=0 W.

The voltage V1 is a voltage obtained across the switching device Q1. The voltage V1 is at a zero level in a period TON in which the switching device Q1 is on, and forms a resonant pulse having a sinusoidal waveform in a period TOFF in which the switching device Q1 is off. The resonant pulse waveform of the voltage V1 indicates that the operation of the primary side switching converter is voltage resonant type operation.

The switching current IQ1 flows through the switching device Q1 (and the body diode DD). The switching current IQ1 flows in a waveform shown in the figures in the period TON, and is at a zero level in the period TOFF.

The primary winding current I1 flowing through the primary winding N1 is a combination of a current component flowing as the switching current IQ1 in the period TON and a current flowing through the primary-side parallel resonant capacitor Cr in the period TOFF.

Though shown in only FIG. 9A, the rectified currents ID1 and ID2 flowing through the rectifier diodes Do1 and Do2 as the operation of a secondary side rectifier circuit each have a sinusoidal waveform as shown in the figure. In this case, the resonant operation of the secondary side series resonant circuit appears more dominantly in the waveform of the rectified current ID1 than in the waveform of the rectified current ID2.

The secondary winding current I2 flowing through the secondary winding N2 has a waveform obtained by combining the rectified currents ID1 and ID2 with each other.

FIG. 10 shows switching frequency fs, the period TON and the period TOFF of the switching device Q1, and AC→DC power conversion efficiency (ηAC→DC) with respect to load variation in the power supply circuit shown in FIG. 8.

The AC→DC power conversion efficiency (ηAC→DC) shows that high efficiencies of 90% and more are obtained in a wide range of the load power Po=50 W to 200 W. The inventor of the present application has previously confirmed by experiment that such characteristics are obtained when a secondary side series resonant circuit is combined with a voltage resonant converter of a single-ended system.

The switching frequency fs, the period TON, and the period TOFF in FIG. 10 represent switching operation as characteristics of constant-voltage control against load variation in the power supply circuit shown in FIG. 8. In this case, the switching frequency fs is substantially constant against load variation. On the other hand, the period TON and the period TOFF are changed linearly in directions opposite from each other, as shown in FIG. 10. This indicates that the switching operation is controlled by changing a duty ratio between the on period and the off period while keeping the switching frequency (switching cycle) substantially constant as the secondary side direct-current output voltage Eo is varied. Such control can be considered PWM (Pulse Width Modulation) control that varies the on/off period within one cycle. The power supply circuit shown in FIG. 8 stabilizes the secondary side direct-current output voltage Eo by this PWM control.

FIG. 11 schematically shows the constant-voltage control characteristics of the power supply circuit shown in FIG. 8 by a relation between the switching frequency fs (kHz) and the secondary side direct-current output voltage Eo.

The power supply circuit shown in FIG. 8 has the primary side parallel resonant circuit and the secondary side series resonant circuit. The power supply circuit shown in FIG. 8 therefore has two resonant impedance characteristics in a composite manner, that is, a resonant impedance characteristic corresponding to the resonant frequency fo1 of the primary side parallel resonant circuit and a resonant impedance characteristic corresponding to the resonant frequency fo2 of the secondary side series resonant circuit. Further, since the power supply circuit shown in FIG. 8 has the relation of fo1≈2.8×fo2, the secondary side series resonance frequency fo2 is lower than the primary side parallel resonance frequency fo1, as shown in FIG. 11.

As for constant-voltage control characteristics with respect to the switching frequency fs under a condition of a constant alternating input voltage VAC, as shown in FIG. 11, characteristic curves A and B respectively represent constant-voltage control characteristics at the maximum load power Pomax and the minimum load power Pomin under the resonant impedance corresponding to the resonant frequency fo1 of the primary side parallel resonant circuit, and characteristic curves C and D respectively represent constant-voltage control characteristics at the maximum load power Pomax and the minimum load-power Pomin under the resonant impedance corresponding to the resonant frequency fo2 of the secondary side series resonant circuit. A variable range (necessary control range) of the switching frequency fs which range is necessary for constant-voltage control at the rated level tg of the secondary side direct-current output voltage Eo under the characteristics shown in FIG. 11 can be represented as a section indicated by Δfs.

The necessary control range Δfs shown in FIG. 11 is from the characteristic curve C at the maximum load power Pomax corresponding to the resonant frequency fo2 of the secondary side series resonant circuit to the characteristic curve B at the minimum load power Pomin corresponding to the resonant frequency fo1 of the primary side parallel resonant circuit. The characteristic curve D at the minimum load power Pomin corresponding to the resonant frequency fo2 of the secondary side series resonant circuit and the characteristic curve A at the maximum load power Pomax corresponding to the resonant frequency fo1 of the primary side parallel resonant circuit are crossed between the characteristic curve C and the characteristic curve B. Further, the range Δfs in the actual power supply circuit shown in FIG. 8 is very narrow.

Thus, as the constant-voltage control operation of the power supply circuit shown in FIG. 8, switching driving control is performed by the PWM control that varies the duty ratio between the periods TON and TOFF in one switching cycle while keeping the switching frequency fs substantially fixed. Incidentally, this is indicated by the fact that the widths of the periods TOFF and TON are changed while the period length of one switching cycle (TOFF+TON) is substantially constant at the maximum load power Pomax=200 W, the load power Po=125 W, and the minimum load power Pomin=0 W as shown in FIGS. 9A, 9B, and 9C.

Such operation is obtained by making a transition from a state in which the resonant impedance (capacitive impedance) at the resonant frequency fo1 of the primary side parallel resonant circuit is dominant to a state in which the resonant impedance (inductive impedance) at the resonant frequency fo2 of the secondary side series resonant circuit is dominant in the narrow variable range (Δfs) of the switching frequency, as resonant impedance characteristics according to load variation in the power supply circuit.

The power supply circuit shown in FIG. 8 has the following problems.

The switching current IQ1 at the maximum load power Pomax as shown in FIG. 9A of the above-described waveform charts of FIGS. 9A to 9C is at a zero level until an end point in time of the period TOFF, which end point is turn-on timing, is reached. When the period TON is reached, the switching current IQ1 first flows as a current of negative polarity through the body diode DD. The switching current IQ1 is then inverted to flow from the drain to the source of the switching device Q1. This operation indicates that ZVS (Zero Voltage Switching) is performed properly.

On the other hand, the switching current IQ1 at Po=120 W corresponding to medium load as shown in FIG. 9B flows as a noise before the end point in time of the period TOFF, which end point is turn-on timing. This operation is abnormal operation in which ZVS is not performed properly.

That is, it is known that the voltage resonant converter having the secondary side series resonant circuit as shown in FIG. 8 performs abnormal operation in which ZVS is not performed properly at medium load. It is confirmed that the actual power supply circuit shown in FIG. 8 performs such abnormal operation in a load variation range indicated as a section A in FIG. 10, for example.

As described above, the voltage resonant converter provided with the secondary side series resonant circuit has, as an inherent tendency, a characteristic of being able to favorably maintain high efficiency against load variation. However, as shown in FIG. 9B, at the time of turning on the switching device Q1, a corresponding peak current flows as the switching current IQ1. This increases a switching loss, and results in a factor in decreasing power conversion efficiency.

At any rate, abnormal operation as described above causes a shift in a phase-gain characteristic of a constant-voltage control circuit system, for example, thus resulting in a switching operation in an abnormal oscillation state. Thus, in a present situation, there is a strong perception that it is in actuality difficult to put the power supply circuit of FIG. 8 to practical use.

SUMMARY OF THE INVENTION

Accordingly, in view of the above problems, a switching power supply circuit according to an embodiment of the present invention is formed as follows.

The switching power supply circuit includes rectifying and smoothing means for obtaining a direct-current input voltage by rectifying and smoothing an alternating input voltage; switching means including a switching device supplied with the direct-current input voltage and performing a switching operation; switching-driving means for driving the switching device to perform the switching operation; and an isolated converter transformer having a primary winding on a primary side and a secondary winding on a secondary side, the primary winding being supplied with a switching output obtained by the switching operation of the switching means and the secondary winding having an alternating voltage induced therein by the primary winding.

The switching power supply circuit further includes a primary side parallel resonant circuit including a leakage inductance component of the primary winding and a capacitance of a primary side parallel resonant capacitor, the primary side parallel resonant circuit converting operation of the switching means into a voltage resonant type operation; and a secondary side series resonant circuit including a leakage inductance component of the secondary winding and a capacitance of a secondary side series resonant capacitor connected in series with the secondary winding.

The switching power supply circuit still further includes secondary side direct-current output voltage generating means for performing a rectifying operation on the alternating voltage induced in the secondary winding and input to the secondary side direct-current output voltage generating means to produce a rectified output, and for smoothing the rectified output using a secondary side smoothing capacitor to generate a secondary side direct-current output voltage; and constant-voltage control means for performing constant voltage control on the secondary side direct-current output voltage by controlling the switching-driving means according to a level of the secondary side direct-current output voltage to adjust the switching frequency of the switching means.

In the switching power supply circuit, a coupling coefficient between the primary side and the secondary side of the isolated converter transformer may be set so as to obtain proper zero voltage switching in a predetermined load condition range of medium load at least. A resonant frequency of the primary side parallel resonant circuit and a resonant frequency of the secondary side series resonant circuit may be set so as to obtain a certain power conversion efficiency and higher under predetermined load conditions at least.

Thus, the present invention eliminates the above-described abnormal operation in a voltage resonant converter provided with a secondary side series resonant circuit. Therefore, the voltage resonant converter provided with the secondary side series resonant circuit is easily put to practical use. In addition, power conversion efficiency is improved by eliminating the abnormal operation.

Further, according to the present invention, the resonant frequency of the primary side parallel resonant circuit and the resonant frequency of the secondary side series resonant circuit are set so as to obtain a certain power conversion efficiency and higher under load conditions of a predetermined load power. A voltage resonant converter inherently has a characteristic of high power conversion efficiency. The present invention can provide a power supply circuit having a characteristic of better power conversion efficiency as a power supply circuit including a voltage resonant converter.

BRIEF DESCRIPTION OF THE DRAWINGS

FIGS. 3A, 3B, and 3C are waveform charts showing the operations of principal parts of the power supply circuit according to the first embodiment on the basis of switching cycles;

FIGS. 9A, 9B, and 9C are waveform charts showing the operations of principal parts of the power supply circuit shown in FIG. 8;

DETAILED DESCRIPTION

Figure 1:
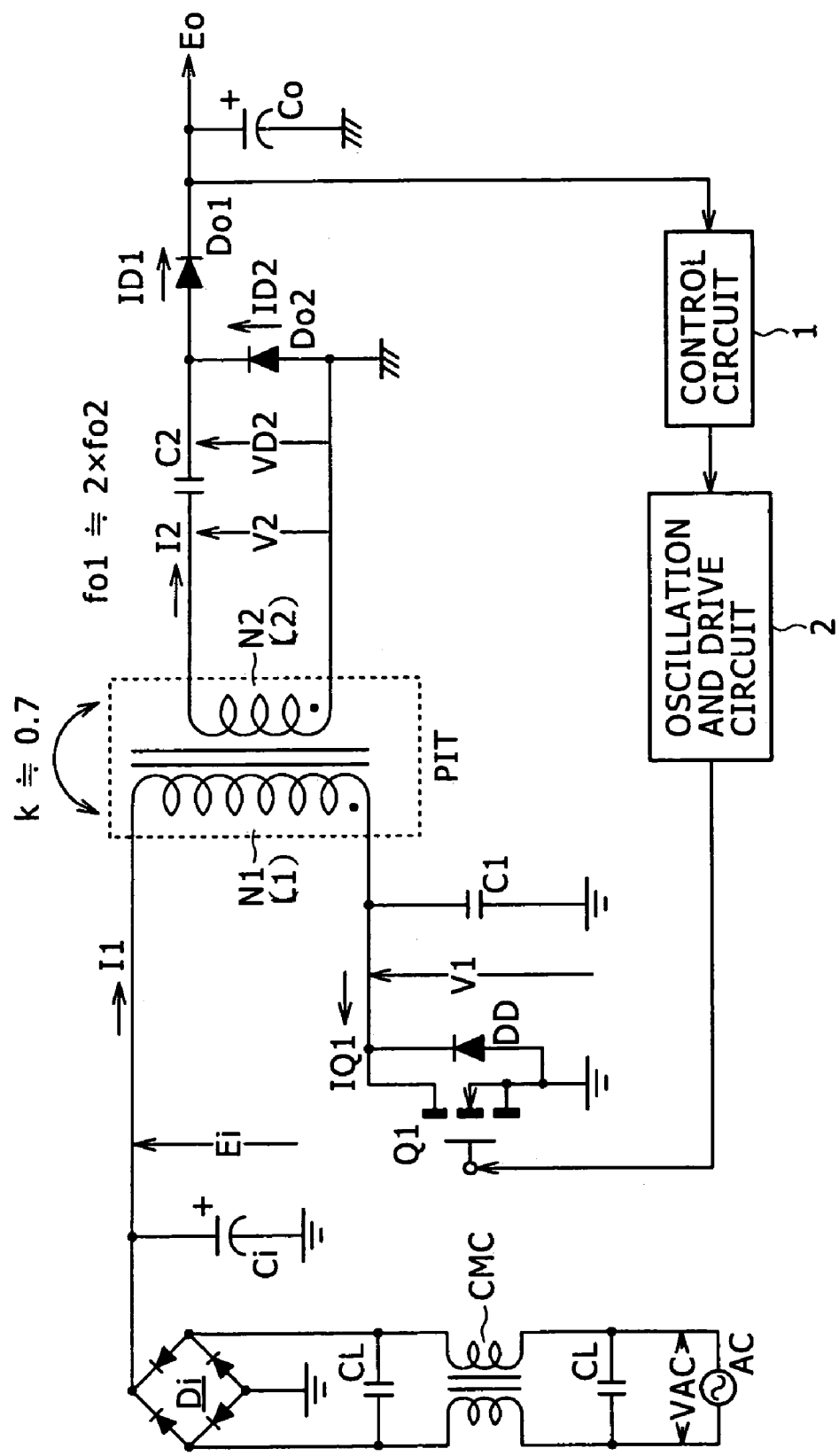
FIG. 1 is a circuit diagram showing an example of configuration of a power supply circuit according to a first embodiment of the present invention.

A circuit diagram of FIG. 1 shows an example of configuration of a power supply circuit according to a first embodiment as the best mode (an embodiment) for carrying out the invention. The power supply circuit shown in this figure employs a fundamental configuration of a voltage resonant switching converter using a single-ended system.

In the switching power supply circuit shown in this figure, a set of common mode choke coils CMC and two across capacitors CL are inserted in the line of a commercial alternating-current power supply AC, as shown in the figure. The common mode choke coils CMC and the across capacitors CL and CL form a noise filter for eliminating common mode noise superimposed on the line of the commercial alternating-current power supply AC.

An alternating input voltage VAC is rectified by a bridge rectifier circuit Di. A smoothing capacitor Ci is charged with the rectified output of the bridge rectifier circuit Di. Thereby a rectified and smoothed voltage Ei is obtained as a voltage across the smoothing capacitor Ci. The rectified and smoothed voltage Ei is a direct-current input voltage for the switching converter in a subsequent stage.

In FIG. 1, the switching converter supplied with the rectified and smoothed voltage Ei as the direct-current input voltage and performing switching operation is formed as a voltage resonant converter of a single-ended system having one switching device Q1, for example. A high withstand voltage MOS-FET is selected as the switching device Q1 in this case. A system for driving the voltage resonant converter in this case is an externally exciting system in which the switching device is switching-driven by an oscillation and drive circuit 2.

A switching driving signal (voltage) output from the oscillation and drive circuit 2 is applied to the gate of the switching device Q1.

The drain of the switching device Q1 is connected to the winding start end part of a primary winding N1 of an isolated converter transformer PIT to be described later. The winding termination end part of the primary winding N1 is connected to the positive electrode terminal of the smoothing capacitor Ci. Thus, in this case, the direct-current input voltage (Ei) is supplied to the switching device Q1 via a series connection of the primary winding N1. The source of the switching device Q1 is connected to a primary side ground.

Since a MOS-FET is selected as the switching device Q1 in this case, a body diode DD is included in the switching device Q1 so as to be connected in parallel with the drain and source of the switching device Q1, as shown in FIG. 1. The body diode DD has an anode connected to the source of the switching device Q1, and a cathode connected to the drain of the switching device Q1. The body diode DD forms a path for passing a switching current in an opposite direction which current is generated by on/off operation (switching operation) of the switching device Q1.

A primary-side parallel resonant capacitor Cr is connected in parallel with the drain and the source of the switching device Q1.

The capacitance of the primary-side parallel resonant capacitor Cr and a leakage inductance L1 of the primary winding N1 of the isolated converter transformer PIT form a primary side parallel resonant circuit (voltage resonant circuit) for a switching current flowing through the switching device Q1. This primary side parallel resonant circuit performs resonant operation, whereby voltage resonant type operation is obtained as switching operation of the switching device Q1. Accordingly, a sinusoidal resonant pulse waveform is obtained as a voltage (drain-to-source voltage) V1 across the switching device Q1 during the off period of the switching device Q1.

The oscillation and drive circuit 2 includes an oscillating circuit to drive the switching device Q1 by an externally exciting system, for example. The oscillation and drive circuit 2 generates a drive signal as a gate voltage for switching-driving the MOS-FET on the basis of an oscillating signal obtained from the oscillating circuit, and applies the drive signal to the gate of the switching device Q1. Thus the switching device Q1 performs continuous on/off operation according to a switching frequency corresponding to the cycle of the drive signal. That is, the switching device Q1 performs switching operation.

The isolated converter transformer PIT transmits the switching output of the primary side switching converter to a secondary side with the primary side and the secondary side insulated from each other against direct current.

Figure 2:
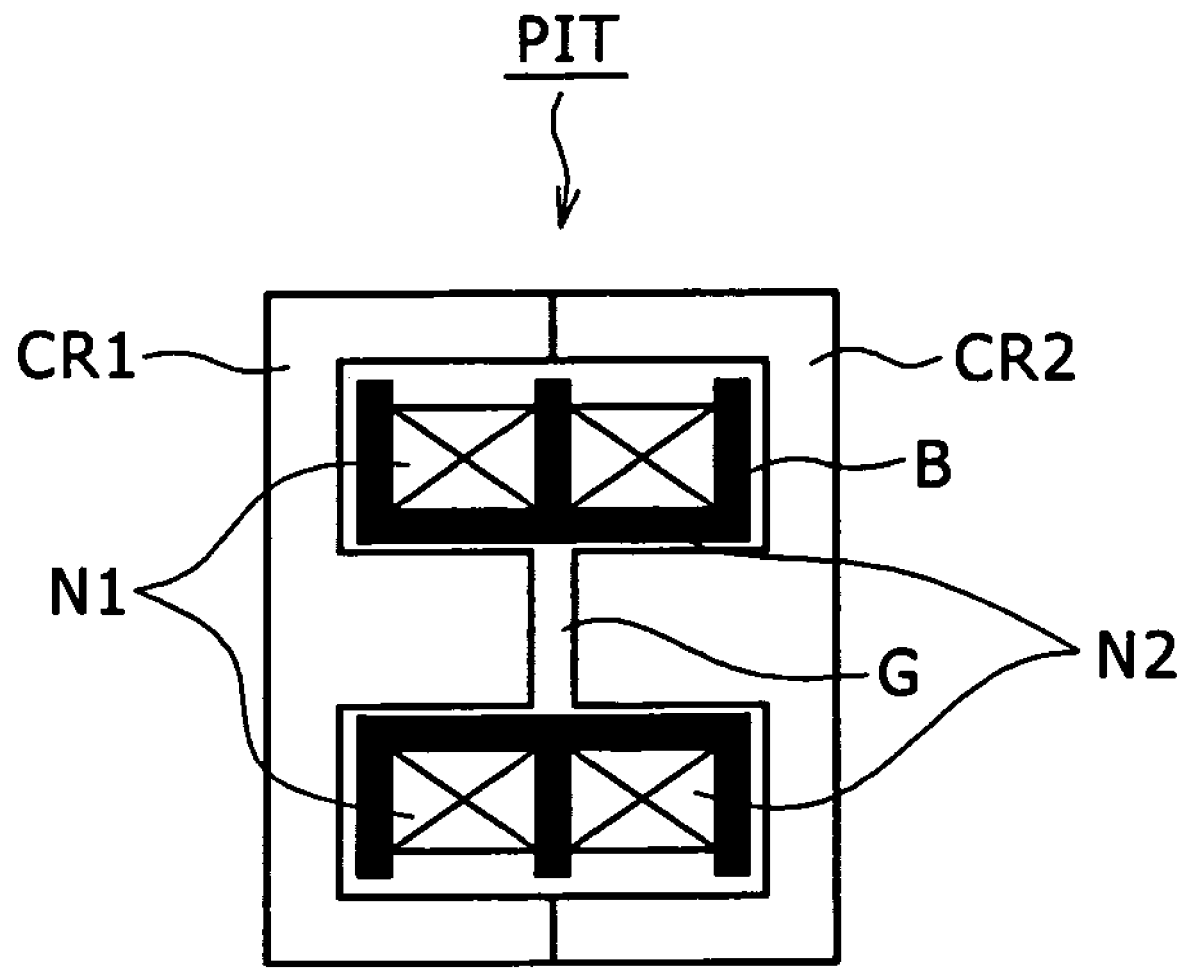
FIG. 2 is a diagram showing an example of structure of an isolated converter transformer provided in the power supply circuit according to the embodiment.

FIG. 2 is a sectional view showing an example of structure of the isolated converter transformer PIT provided in the power supply circuit of FIG. 1.

As shown in FIG. 2, the isolated converter transformer PIT has an EE type core (EE-shaped core) formed by combining E-shaped cores CR1 and CR2 of ferrite material with each other in such a manner that the magnetic legs of the core CR1 are opposed to the magnetic legs of the core CR2.

The isolated converter transformer PIT also has a bobbin B formed by a resin, for example, and having a primary side winding part and a secondary side winding part divided from each other so as to be independent of each other. The primary winding N1 is wound around one winding part of the bobbin B. A secondary winding N2 is wound around the other winding part of the bobbin B. The bobbin B thus wound with the primary side winding and the secondary side winding is attached to the above-described EE type core (CR1 and CR2). Thereby the primary side winding and the secondary side winding are wound around the central magnetic leg of the EE type core in respective different winding regions. The structure of the isolated converter transformer PIT as a whole is thus obtained.

In addition, a gap G having a gap length of about 2 mm or more, for example, is formed in the central magnetic leg of the EE type core as shown in the figure. Thereby a state of loose coupling with a coupling coefficient k≈ about 0.7 or lower, for example, is obtained. That is, a state of even looser coupling is obtained than in the isolated converter transformer PIT of the prior art power supply circuit shown in FIG. 8. Incidentally, the gap G can be formed by making the central magnetic leg of the E-type cores CR1 and CR2 shorter than the two outer magnetic legs of the E-type cores CR1 and CR2.

As described above, one end of the primary winding N1 of the isolated converter transformer PIT is connected to the drain of the switching device Q1. Thereby, the switching output of the switching device Q1 is transmitted to the primary winding N1, so that an alternating voltage occurs in the primary winding N1.

An alternating voltage induced by the primary winding N1 occurs on the secondary side of the isolated converter transformer PIT.

The secondary winding N2 is connected in series with a secondary side series resonant capacitor C2. Thus, the leakage inductance L2 of the secondary winding N2 and the capacitance of the secondary side series resonant capacitor C2 form a secondary side series resonant circuit. This secondary side series resonant circuit performs resonant operation according to rectifying operation of a secondary side rectifier circuit to be described later, whereby a secondary winding current flowing through the secondary winding N2 is in a sinusoidal form. That is, current resonant operation is obtained on the secondary side.

The secondary side rectifier circuit in this case is formed as a voltage doubler half-wave rectifier circuit by connecting two rectifier diodes Do1 and Do2 and one smoothing capacitor Co to the secondary winding N2 connected in series with the secondary side series resonant capacitor C2 as described above. As for a mode of connection of this voltage doubler half-wave rectifier circuit, the winding termination end part side of the rectifier circuit secondary winding N2 is connected with the anode of the rectifier diode Do1 and the cathode of the rectifier diode Do2 via the secondary side series resonant capacitor C2. The cathode of the rectifier diode Do1 is connected to the positive electrode terminal of the smoothing capacitor Co. The winding start end part of the secondary winding N2, the anode of the rectifier diode Do2, and the negative electrode terminal of the smoothing capacitor Co are connected to a secondary side ground.

The rectifying operation of the thus formed voltage doubler half-wave rectifier circuit is as follows.

First, in a half cycle corresponding to one polarity of a secondary winding voltage V2, a forward voltage is applied to the rectifier diode Do2. Therefore the rectifier diode Do2 conducts to charge the secondary side series resonant capacitor C2 with a rectified current. Thereby a voltage is generated across the secondary side series resonant capacitor C2, the voltage having a level corresponding to the level of the alternating voltage multiplied by unity which voltage is induced in the secondary winding N2. Next, in a half cycle corresponding to another polarity of the secondary winding voltage V2, a forward voltage is applied to the rectifier diode Do2, and thus the rectifier diode Do2 conducts. At this time, the smoothing capacitor Co is charged by a potential obtained by superimposing the potential of the secondary winding voltage V2 on the voltage across the secondary side series resonant capacitor C2.

Thereby a secondary side direct-current output voltage Eo having a level corresponding to twice the level of the alternating voltage induced in the secondary winding N2 is obtained as a voltage across the smoothing capacitor Co. In this rectifying operation, the smoothing capacitor Co is charged only in one half cycle of the alternating voltage induced in the secondary winding N2. That is, voltage doubler half-wave rectifier operation is obtained.

The secondary side direct-current output voltage Eo is supplied to a load. The secondary side direct-current output voltage Eo also branches off to be output as a detection voltage to a control circuit 1.

The control circuit 1 supplies the oscillation and drive circuit 2 with a detection output according to change in the level of the secondary side direct-current output voltage Eo input to the control circuit 1. The oscillation and drive circuit 2 drives the switching device Q1 while changing a switching frequency or a duty ratio (conduction angle) between an on period TON and an off period TOFF in one switching cycle according to the detection output of the control circuit 1 which output is input to the oscillation and drive circuit 2. This operation is constant-voltage control operation for the secondary side direct-current output voltage.

A basic constant-voltage control operation of a voltage resonant converter changes switching frequency by fixing the off period TOFF of the switching device Q1 and variably controlling the on period TON of the switching device Q1. However, when a secondary side series resonant circuit is provided as in the present embodiment, a constant-voltage control operation as PWM (Pulse Width Modulation) control in which a conduction angle within one switching cycle is controlled, as described above, is performed. That is, composite control of switching frequency control and PWM control is performed as constant-voltage control operation as a whole.

By variably controlling the switching frequency and the conduction angle of the switching device Q1 as described above, the resonant impedances of the primary side and the secondary side in the power supply circuit and a power transmission effective period are changed, so that an amount of power transmitted from the primary winding N1 to the secondary winding N2 of the isolated converter transformer PIT and an amount of power to be supplied from the secondary side rectifier circuit to the load are changed. The level of the secondary side direct-current output voltage Eo is thereby controlled so as to cancel variations in the level of the secondary side direct-current output voltage Eo. That is, the secondary side direct-current output voltage Eo is stabilized.

Actual principal parts of the power supply circuit having the circuit configuration shown in FIG. 1 are formed by making settings as follows.

For the isolated converter transformer PIT, an EER-35 core is selected, and the gap G is set to a gap length of 2.2 mm. As for the respective numbers of turns of the primary winding N1 and the secondary winding N2, N1=38 T and N2=27 T are selected. Thereby k=0.67 is set as the coupling coefficient k of the isolated converter transformer PIT.

Cr=5600 pF is selected as the capacitance of the primary-side parallel resonant capacitor Cr. The resonant frequency fo1=219 kHz of the primary side parallel resonant circuit is set by this capacitance setting of the primary-side parallel resonant capacitor Cr and the leakage inductance L1 of the primary winding N1 obtained by the structure of the isolated converter transformer PIT. C2=0.039 µF is selected as the capacitance of the secondary side series resonant capacitor C2. The resonant frequency fo2=113.3 kHz of the secondary side series resonant circuit is set by this capacitance setting of the secondary side series resonant capacitor C2 and the leakage inductance L2 of the secondary winding N2 obtained by the structure of the isolated converter transformer PIT. It can be said that in relative terms, there is a relation of fo1≈2×fo2.

As for load power handled by the power supply circuit, maximum load power Pomax=300 W, and minimum load power Pomin=0 W (no load). The rated level of the secondary side direct-current output voltage Eo is 175 V.

Waveform charts of FIGS. 3A, 3B, and 3C show the operations of principal parts in the power supply circuit shown in FIG. 1 on the basis of the switching cycle of the switching device Q1. FIG. 3A shows a switching voltage V1, a switching current IQ1, a primary winding current I1, a secondary winding current I2, a secondary side rectified voltage VD2, and secondary side rectified currents ID1 and ID2 at the maximum load power Pomax=300 W. FIG. 3B shows the switching voltage V1, the switching current IQ1, the primary winding current I1, and the secondary winding current I2 at the load power Po=225 W for a medium load. FIG. 3C shows the switching voltage V1, the switching current IQ1, and the secondary winding voltage V2 at the minimum load power Pomin=0 W.

The fundamental operation of the power supply circuit of FIG. 1 will be described with reference to the waveform chart of FIG. 3A at the maximum load power Pomax=300 W.

The switching voltage V1 is the drain-to-source voltage of the switching device Q1. The switching current IQ1 is a current flowing from a drain side to the switching device Q1 (and the body diode DD). The switching voltage V1 and the switching current IQ1 indicate on/off timing of the switching device Q1. One switching cycle is divided into a period TON during which the switching device Q1 is turned on and a period TOFF during which the switching device Q1 is turned off. The switching voltage V1 is at a zero level in the period TON, and forms a resonant pulse in the period TOFF. The resonant pulse of the switching voltage V1 is obtained as a sinusoidal resonant waveform because the operation of the primary side switching converter is voltage resonant type operation.

The switching current IQ1 is at a zero level in the period TOFF. On reaching turn-on timing when the period TOFF is ended and the period TON is started, the switching current IQ1 first forms a waveform of negative polarity by flowing through the body diode DD. The switching current IQ1 is then inverted to form a waveform of positive polarity by flowing from the drain to the source. Such waveforms of the switching current IQ1 indicate that ZVS is performed properly.

The switching current IQ1 flowing in positive polarity in the period TON includes a sinusoidal-shaped part corresponding to the secondary winding current I2 (secondary side series resonance current) to be described later. This indicates that the current flowing in the primary side switching converter is affected by the secondary side series resonant circuit.

The primary winding current I1 is a current flowing through the primary winding N1, and is a combination of a current component flowing through the switching device Q1 and a current flowing through the primary-side parallel resonant capacitor Cr. The waveform of the primary winding current I1 in the period TOFF corresponds to the waveform of the current flowing through the primary-side parallel resonant capacitor Cr.

The secondary winding current I2, the secondary side rectified voltage VD2, and the secondary side rectified currents ID1 and ID2 represent the operation of the secondary side rectifier circuit.

According to the alternating voltage (V2) induced in the secondary winding N2, the rectifier diodes Do1 and Do2 alternately conduct in the respective half-cycle periods of the alternating voltage V2, as described above. The secondary side rectified voltage VD2 as voltage across the rectifier diode Do2 is at a zero level during the half wave period during which the rectifier diode Do2 conducts and thus the secondary side rectified current ID2 flows, and is clamped at the secondary side direct-current output voltage Eo during the half wave period during which the rectifier diode Do1 conducts and thus the secondary side rectified current ID1 flows.

The secondary side rectified currents ID1 and ID2 flow to the smoothing capacitor Co so as to alternate with each other in a half-wave sinusoidal form, as shown in the figure. The secondary winding current I2 flowing through the secondary winding N2 is obtained by combining the secondary side rectified currents ID1 and ID2 with each other, and is in a sinusoidal form as shown in the figure. The sinusoidal form of the secondary winding current I2 is obtained by the resonant operation of the secondary side series resonant circuit. That is, the sinusoidal form of the secondary winding current I2 is obtained as a current resonance (series resonance) waveform.

The secondary side rectified currents ID1 and ID2 in this case flow with substantially the same conduction angle and the same peak level.

Reference to waveforms at the medium load power Po=225 W as shown in FIG. 3B and waveforms at the minimum load power Pomin=0 W as shown in FIG. 3C with the operations of the respective parts as shown in FIG. 3A in mind shows that the operation of the primary side switching converter shortens the period length of one switching cycle (TOFF+TON) as a transition is made from light load to no load. This indicates that as constant-voltage control operation according to load variation in a range of the maximum load power Pomax to the minimum load power Pomin, corresponding change is made to the switching frequency, as will be later described. In addition, directing attention to the duty ratio between the period TOFF and the period TON, the period TOFF is increased, but the period TON is reduced as a transition is made from light load to no load. This indicates that as constant-voltage control operation according to load variation in the range of the maximum load power Pomax to the minimum load power Pomin, the duty ratio between the period TOFF and the period TON is also changed by PWM control.

The waveform of the switching current IQ1 at the medium load power Po=225 W as shown in FIG. 3B shows that the switching current IQ1 flows in negative polarity through the body diode DD in timing in which the period TON is started, as in the case of FIG. 3A. That is, proper ZVS is obtained. This is true for the switching current IQ1 at the minimum load power Pomin=0 W as shown in FIG. 3C. This indicates that the power supply circuit shown in FIG. 1 guarantees ZVS operation in all the range of load power handled by the power supply circuit.

Figure 4:
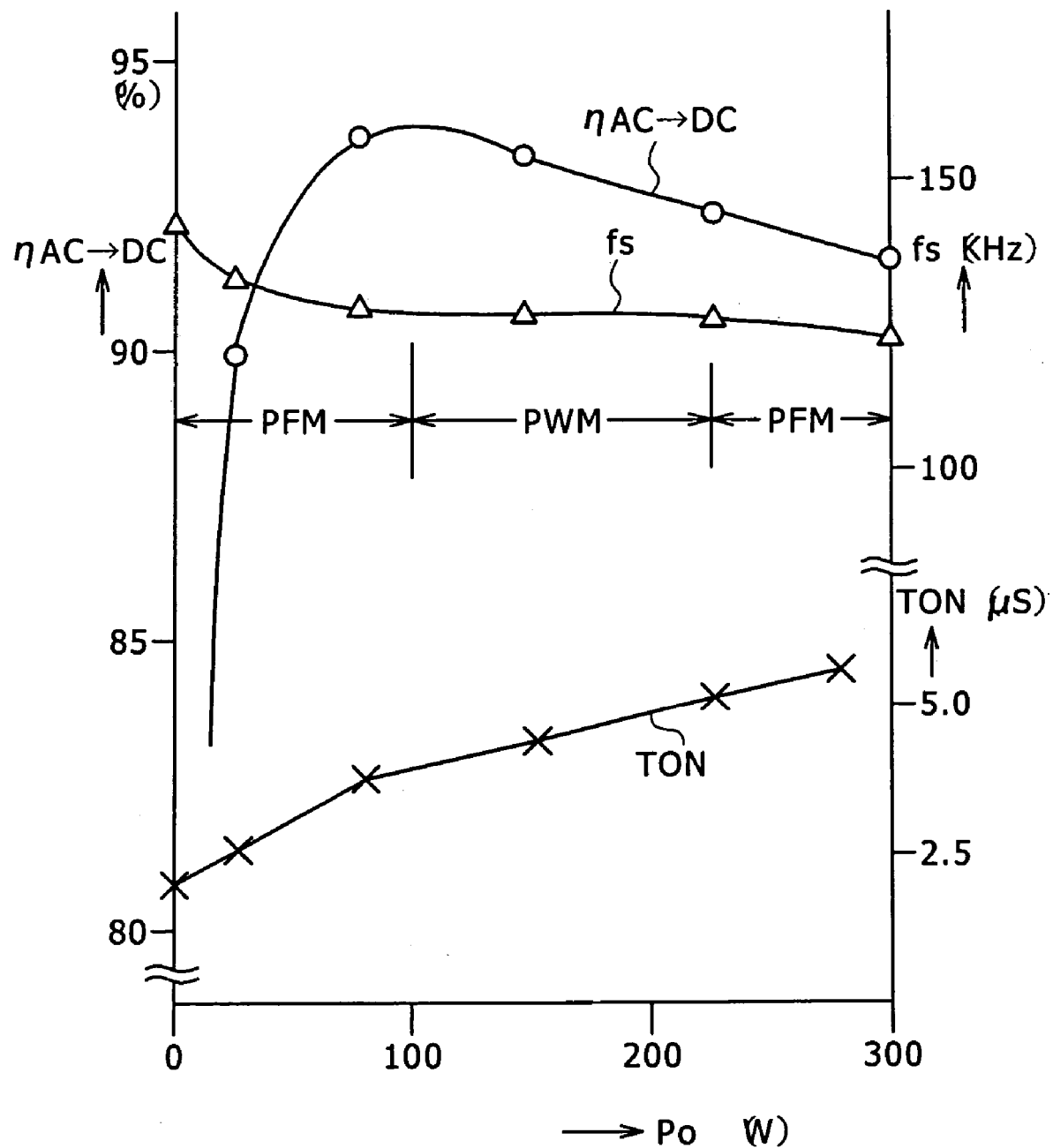
FIG. 4 is a diagram showing characteristics of variation of AC→DC power conversion efficiency, switching frequency, and the on period of a switching device with respect to load variation in the power supply circuit according to the first embodiment.

FIG. 4 shows characteristics of variation of AC→DC power conversion efficiency (ηAC→DC), the switching frequency fs, and the time length of the period TON with respect to load variation as results of an experiment on the power supply circuit shown in FIG. 1.

As shown in FIG. 4, the time length of the period TON increases as the load becomes heavier in the range of the minimum load power Pomin to the maximum load power Pomax. The switching frequency fs is changed so as to be increased as the load becomes lighter in a range of heavy load conditions from the maximum load power Pomax=300 W to the medium load power Po=about 225 W. The switching frequency fs is hardly changed and may be considered constant in a range of medium load conditions from the load power Po=about 225 W to the load power Po=about 125 W. In a range of light load conditions from the load power Po=about 125 W to the minimum load power Pomin=0 W, the switching frequency is increased again as the load becomes lighter.

The characteristics of such a switching frequency fs indicate that an operation mode for constant-voltage control in the power supply circuit of FIG. 1 makes transitions such that constant-voltage control is performed mainly by switching frequency control (PFM) in the ranges of heavy loads (Po: 300 W to 225 W) and light loads (Po: 125 W to 0 W) and constant-voltage control is performed mainly by PWM control in the range of medium loads (Po: 125 W to 225 W). However, in practice, the period TON is changed with load variation from the maximum load power Pomax=300 W to the minimum load power Pomin=0 W as shown in the figure, and though not shown in the figure, the period TOFF is also changed with the load variation. Thus, from a viewpoint of the entire range of loads handled by the power supply circuit, composite constant-voltage control operation in which switching frequency control and PWM control are effected simultaneously is performed. Such composite control has high control sensitivity.

Results of actual measurements relating to constant-voltage control are as follows.

A variable range of the switching frequency fs which range is necessary to stabilize the secondary side direct-current output voltage Eo at 175 V against the load variation from the maximum load power Pomax=300 W to the minimum load power Pomin=0 W is 122.0 kHz to 142.8 kHz, and a frequency difference thereof (Δfs) is 20.8 kHz. With the load variation from the maximum load power Pomax=300 W to the minimum load power Pomin=0 W, the period TON is changed in a range of 5.4 μs to 2.4 μs, and the period TOFF is changed in a range of 2.8 μs to 4.6 μs.

The AC→DC power conversion efficiency (ηAC→DC) is ηAC→DC=91.8% at the maximum load power Pomax=300 W. The AC→DC power conversion efficiency (ηAC→DC) is increased as the load becomes lighter in a range from the maximum load power Pomax=300 W to Po=about 75 W. A maximum value of ηAC→DC=93.9% was measured. Although the AC→DC power conversion efficiency (ηAC→DC) is decreased under conditions of light loads of Po=75 W and less, ηAC→DC=90.2% at the load power Po=25 W. That is, the value of the AC→DC power conversion efficiency (ηAC→DC) is 90% or higher in almost all the range of load power handled by the power supply circuit. For example, 92.9% is an average value of ηAC→DC measured under load conditions at a load power of 100% of the maximum load power, a load power of 75% of the maximum load power, a load power of 50% of the maximum load power, and a load power of 25% of the maximum load power. Thus, the power supply circuit according to the present embodiment has very favorable AC→DC power conversion efficiency.

The following can be said for the power supply circuit of FIG. 1 described thus far.

As compared with the power supply circuit of FIG. 1, as described with reference to FIG. 9B, the power supply circuit of FIG. 8 causes abnormal operation at medium load, in which operation a current flows through the switching device Q1 in a positive electrode direction (from the drain to the source in this case) before the end of the off period (TOFF) of the switching device Q1 and thus ZVS operation is not obtained. It is therefore considered difficult to put the power supply circuit of FIG. 8 to practical use.

On the other hand, as described with reference to the waveform charts of FIGS. 3A to 3C, the power supply circuit according to the present embodiment shown in FIG. 1 performs ZVS operation in the entire range of load power handled by the power supply circuit. That is, abnormal operation at medium load is eliminated. Thus, a voltage resonant converter of a single-ended system provided with a secondary side series resonant circuit can be readily put to practical use.

Abnormal operation at medium load is eliminated mainly by setting a state of loose coupling at a coupling coefficient k≈0.7 or lower, for example, in the isolated converter transformer PIT.

It is confirmed that abnormal operation at medium load described as conventional operation occurs when a voltage resonant converter is provided with a secondary side series resonant circuit. That is, the abnormal operation is caused by interaction when a primary side parallel resonant circuit forming the voltage resonant converter and the secondary side series resonant circuit operate simultaneously. Accordingly, when the coupling coefficient k of the isolated converter transformer PIT is set to a required value lower than a conventional value as in the power supply circuit according to the present embodiment, the interaction between the primary side parallel resonant circuit and the secondary side series resonant circuit is weakened, and thus abnormal operation at medium load is eliminated. Specifically, a phenomenon shown in FIG. 9B, for example, in which the switching current IQ1 of positive polarity flows before and after timing of the end of the period TOFF is not observed, and the waveform of the switching current IQ1 corresponding to normal ZVS is obtained.

Figure 5:
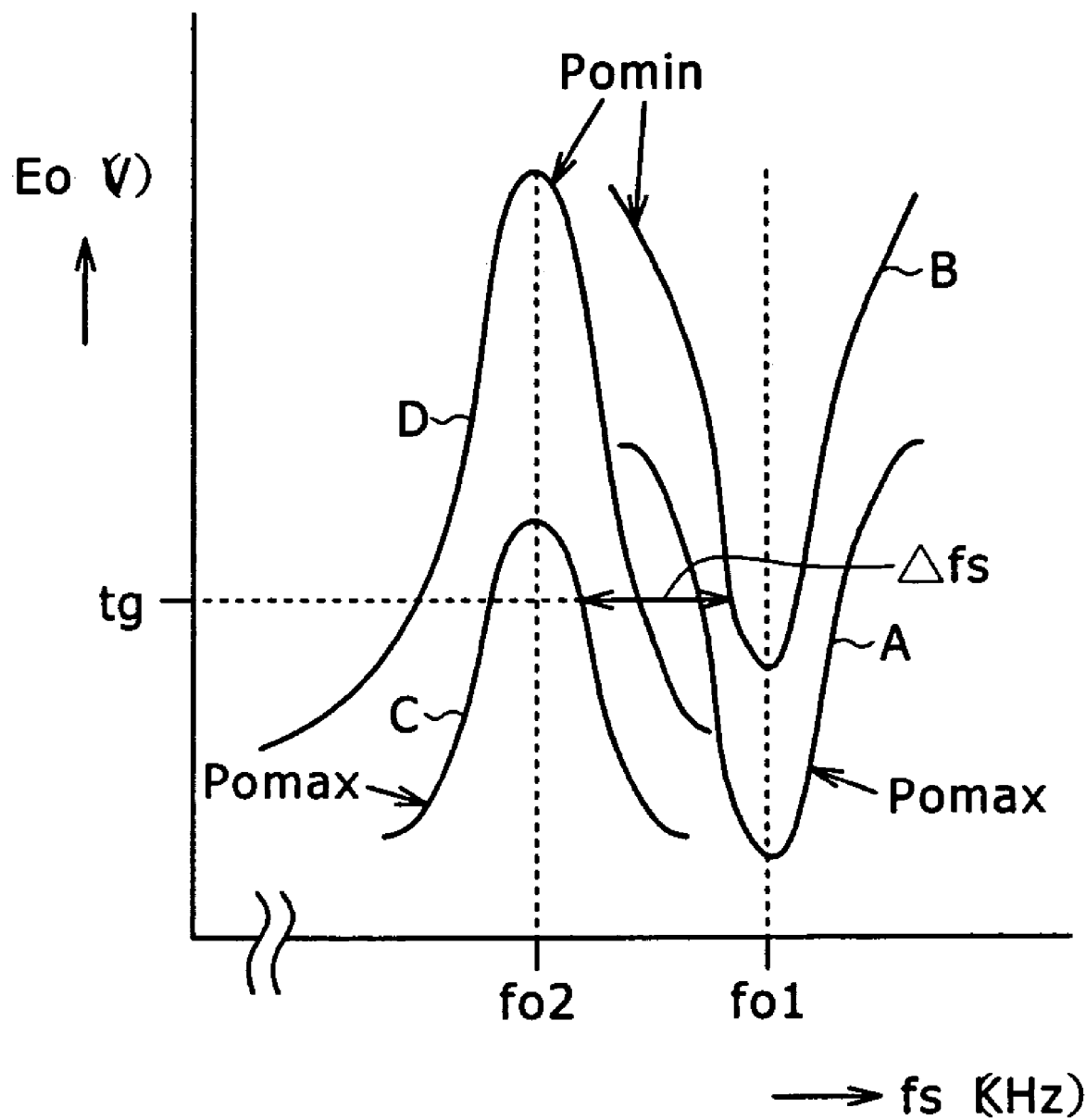
FIG. 5 is a diagram conceptually showing constant-voltage control characteristics of the power supply circuit according to the embodiment.

The constant-voltage control characteristics of the power supply circuit in which the above-described coupling coefficient of the isolated converter transformer PIT is set for the voltage resonant converter provided with the secondary side series resonant circuit as in the present embodiment are schematically shown in FIG. 5, for example.

FIG. 5 shows characteristic curves A, B, C, and D. The characteristic curves A and B represent constant-voltage control characteristics at the maximum load power Pomax and the minimum load power Pomin, respectively, which characteristics correspond to the resonant frequency fo1 of the primary side parallel resonant circuit. The characteristic curves C and D represent constant-voltage control characteristics at the maximum load power Pomax and the minimum load power Pomin, respectively, which characteristics correspond to the resonant frequency fo2 of the secondary side series resonant circuit.

In general, a parallel resonant circuit has a characteristic of increasing resonant impedance as approaching resonant frequency. Thus, in relation to the resonant frequency fo1 of the primary side parallel resonant circuit and the switching frequency fs, the secondary side direct-current output voltage Eo forms quadratic curves in which the level of the secondary side direct-current output voltage Eo is lowered as the switching frequency fs approaches the resonant frequency, as represented by the characteristic curves A and B in FIG. 5. The characteristic curves A and B also show that as constant-voltage control characteristics corresponding to the resonant frequency fo1 of the primary side parallel resonant circuit, the level of the secondary side direct-current output voltage Eo at the maximum load power Pomax is shifted so as to be lowered by a predetermined amount from the level of the secondary side direct-current output voltage Eo at the minimum load power Pomin at the same switching frequency. That is, supposing that the switching frequency fs is fixed, the level of the secondary side direct-current output voltage Eo is lowered as the load becomes heavier.

A series resonant circuit has a characteristic of decreasing resonant impedance as approaching resonant frequency. Thus, in correspondence with the resonant frequency fo2 of the secondary side series resonant circuit, the secondary side direct-current output voltage Eo forms quadratic curves in which the level of the secondary side direct-current output voltage Eo is raised as the switching frequency fs approaches the resonant frequency, as represented by the characteristic curves C and D. Also as constant-voltage control characteristics corresponding to the resonant frequency fo2 of the secondary side series resonant circuit, the level of the secondary side direct-current output voltage Eo at the maximum load power Pomax is shifted so as to be lowered by a predetermined amount from the level of the secondary side direct-current output voltage Eo at the minimum load power Pomin at the same switching frequency.

Since the relation of fo1≈2×fo2 is set in the present embodiment, the resonant frequency fo1 is shown as a value higher than the resonant frequency fo2 on an axis of abscissas indicating the switching frequency.

When the power supply circuit according to the present embodiment providing such characteristic curves A, B, C, and D actually stabilizes the secondary side direct-current output voltage Eo at a predetermined rated level tg (175 V), the variable range (necessary control range) of the switching frequency is indicated by Δfs in FIG. 5. Such a characteristic signifies that for example a transition from control depending on the resonant impedance (capacitive inductance) at the resonant frequency fo1 of the primary side parallel resonant circuit to control depending on the resonant impedance (inductive impedance) at the resonant frequency fo2 of the secondary side series resonant circuit is made by changing the switching frequency in the necessary control range Δfs.

Such a control transition can be considered to correspond to the transition of the constant-voltage control operation mode changed according to load variation as described with reference to FIG. 4. Such an operation can be regarded as a factor in obtaining proper ZVS operation at medium load.

The coupling coefficient k of the conventional voltage resonant converter is not made as low as the coupling coefficient k of the isolated converter transformer PIT in the present embodiment so as to provide a state of loose coupling for a reason that the low coupling coefficient k invites a decrease in power conversion efficiency due to an increase in a loss of power transmitted from the primary side to the secondary side.

However, as shown as an experimental result in FIG. 4, the present embodiment has a very favorable power conversion efficiency characteristic over substantially the entire range of load power handled by the power supply circuit.

High power conversion efficiency is obtained in the present embodiment on the basis of the following constitutions.

It is known that the constitution of the power supply circuit in which the secondary side series resonant circuit is provided for the voltage resonant converter is essentially advantageous in terms of power conversion efficiency. In particular, this constitution has a characteristic quality in that power conversion efficiency increases as a transition is made from the maximum load power to light load, and can therefore be said to have a very favorable power conversion efficiency characteristic against load variation as compared with a current resonant converter that decreases power conversion efficiency as the load becomes lighter. In addition, by employing the single-ended system for the voltage resonant converter and using a minimum requirement of one switching device, a switching loss is reduced as compared with constitutions having a plurality of switching devices, such for example as a half-bridge coupling system, a full-bridge coupling system, and a push-pull system. This is another factor in improving the power conversion efficiency.

In addition, as described above, the present embodiment provides proper ZVS operation by eliminating abnormal operation at medium load. In the phenomenon of this abnormal operation, the switching device Q1 is turned on before turn-on timing (start of the period TON), and the switching current IQ1 of positive polarity flows between the source and the drain of the switching device Q1, as shown in FIG. 9B. Such an operation of the switching current IQ1 increases a switching loss. In the present embodiment, the operation of the switching current IQ1 corresponding to the abnormal operation does not occur, and thereby the increase in the switching loss is eliminated. This is a factor in improving the power conversion efficiency.

Further, in the power supply circuit shown in FIG. 1, the setting of the respective resonant frequencies fo1 and fo2 of the primary side parallel resonant circuit and the secondary side series resonant circuit is a major factor in improving the power conversion efficiency. As described above, in the present embodiment, 92.9% is an average value of power conversion efficiency (ηAC→DC) measured under load conditions at a load power of 100% of the maximum load power, a load power of 75% of the maximum load power, a load power of 50% of the maximum load power, and a load power of 25% of the maximum load power. The power conversion efficiency characteristic under such load conditions is ultimately obtained by adjusting the resonant frequencies fo1 and fo2. That is, the power conversion efficiency characteristic was obtained finally after experiments were performed with various settings made for the resonant frequencies fo1 and fo2 and a relation of fo1≈2×fo2 was set with fo1=219 kHz and fo2=113.3 kHz as described above.

One reason for the improvement of the power conversion efficiency by setting the resonant frequencies fo1 and fo2 as described above is as follows. As is understood from a comparison of the switching current IQ1 in FIG. 3A with the switching current IQ1 in FIG. 9A, the waveform of the switching current IQ1 in FIG. 3A corresponding to the present embodiment has a peak before the end of the period TON.

The waveform of this switching current IQ1 corresponds to the sinusoidal waveform of the secondary winding current I2, as described above with reference to FIG. 3A. That is, the waveform of the switching current IQ1 has a waveform component corresponding to the current resonance waveform obtained by the resonant operation of the secondary side series resonant circuit. The waveform of the secondary winding current I2 is determined by the setting of the resonant frequency fo2 in relation to the resonant frequency fo1.

Thus, the waveform of the switching current IQ1 in the power supply circuit shown in FIG. 1 is obtained by the appropriate setting of the respective resonant frequencies fo1 and fo2 of the primary side parallel resonant circuit and the secondary side series resonant circuit.

The waveform of the switching current IQ1 shown in FIGS. 3A, 3B, and 3C indicates that the level of the switching current IQ1 is restrained during the turn-off time. When the level of the switching current IQ1 is restrained during the turn-off time, a switching loss during the turn-off time is correspondingly reduced, and thus the power conversion efficiency is improved.

Further, the isolated converter transformer PIT in the power supply circuit shown in FIG. 1 has a state of loose coupling with a coupling coefficient k of a certain value or lower, whereby one-sidedness of lines of magnetic force of the secondary winding N2 is eliminated. Thereby, as shown in FIG. 3A, an imbalance between the peak levels of the secondary side rectified currents ID1 and ID2 flowing in the secondary side rectifier circuit is eliminated, and the peak levels of the secondary side rectified currents ID1 and ID2 are equal to each other at 5 Ap, for example.

Figure 8:
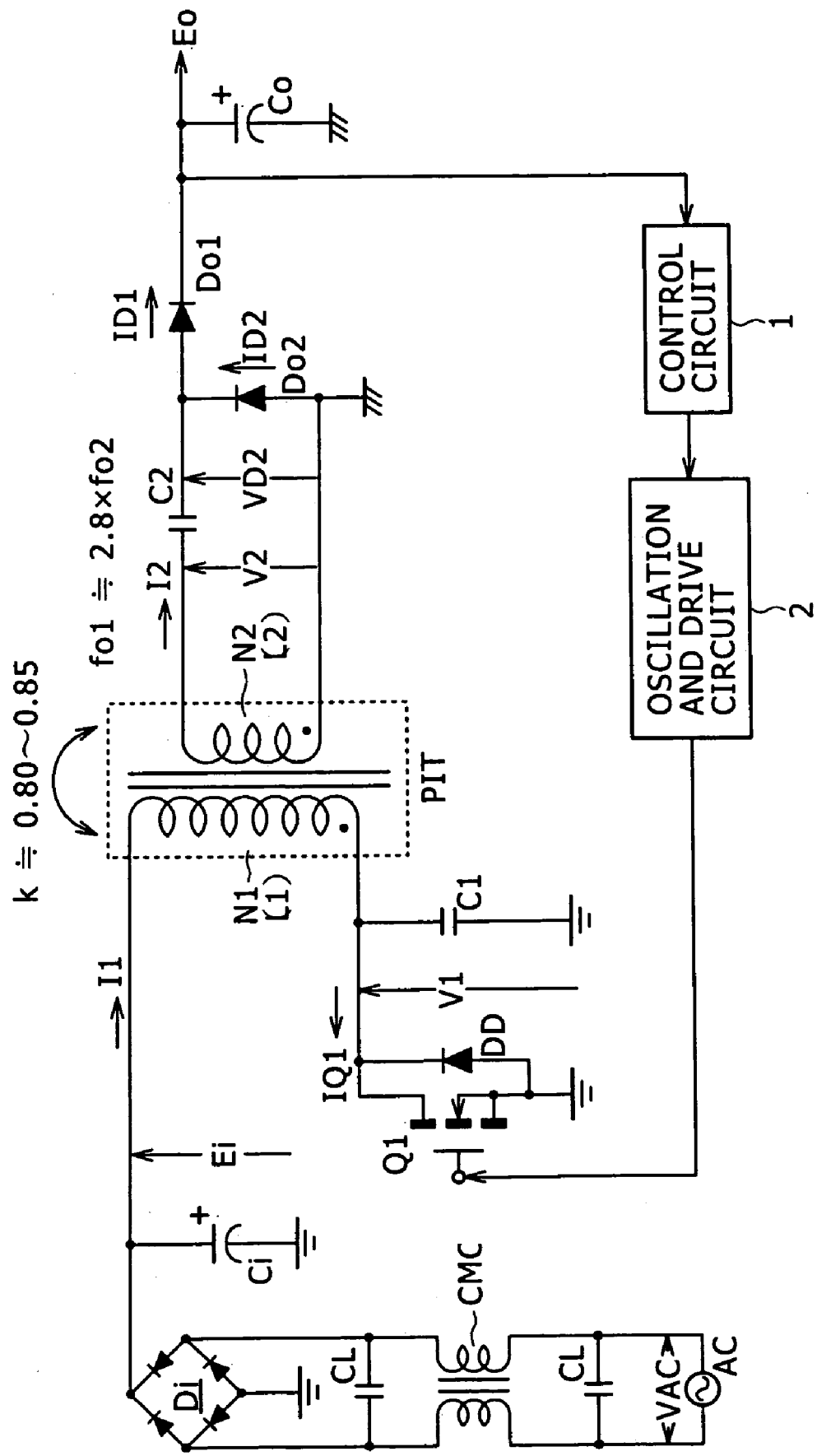
FIG. 8 is a circuit diagram showing an example of configuration of a power supply circuit as a conventional example.
Figure 10:
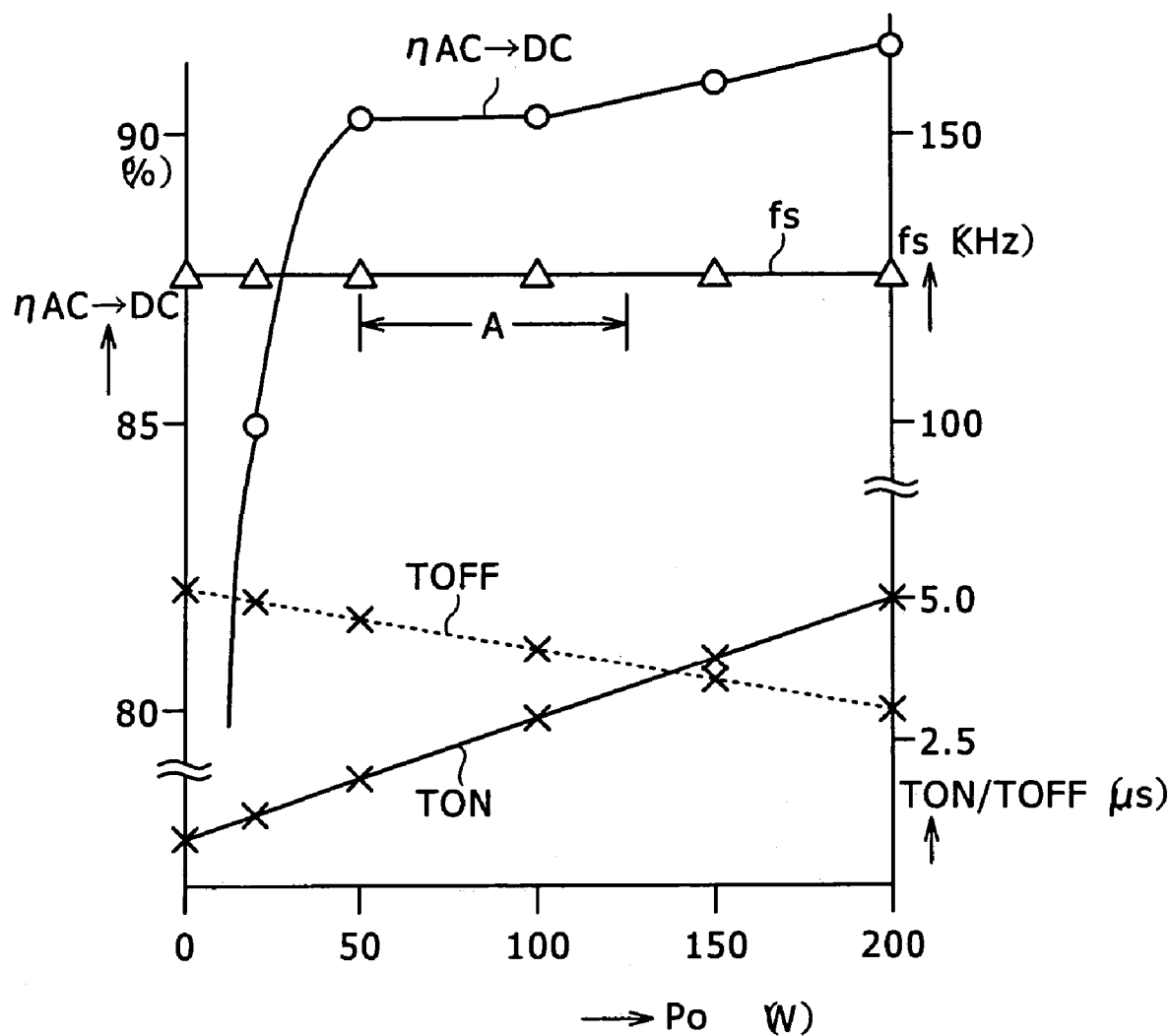
FIG. 10 is a diagram showing characteristics of variation of AC→DC power conversion efficiency, switching frequency, and the on period of a switching device with respect to load variation in the power supply circuit shown in FIG. 8.
Figure 11:
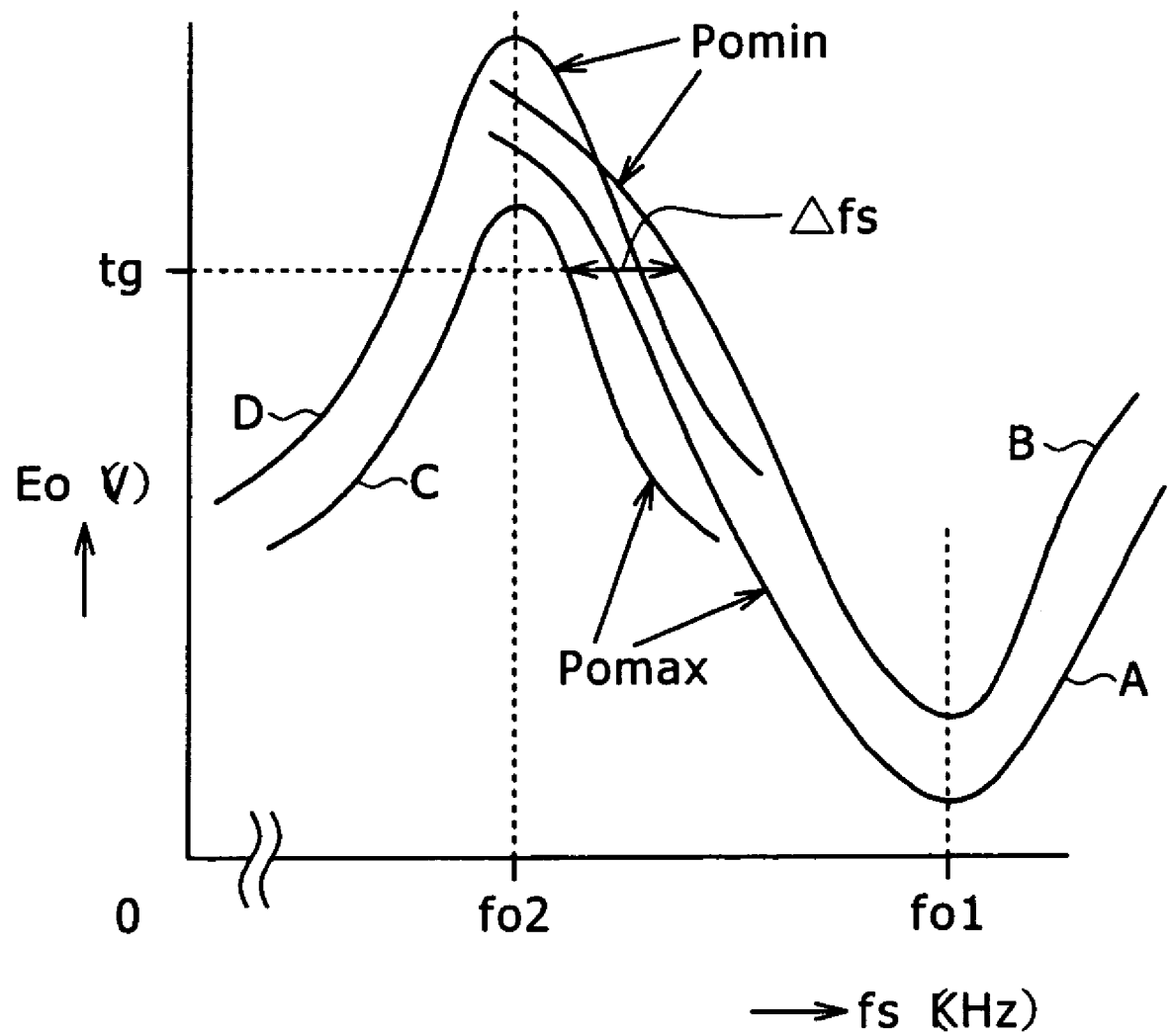
FIG. 11 is a diagram conceptually showing constant-voltage control characteristics of the conventional power supply circuit.

The power supply circuit shown in FIG. 8 as a conventional example causes one-sidedness of lines of magnetic force because the power supply circuit has a coupling coefficient k of a certain value or higher. Thus, there is an imbalance between the peak levels of the secondary side rectified currents ID1 and ID2 in FIG. 9A. Such an imbalance between the rectified currents also increases a power loss due to a conduction loss in the rectifier diode.

On the other hand, as in the present embodiment, when the imbalance between the peak levels of the secondary side rectified currents ID1 and ID2 is eliminated, the power loss due to the imbalance is also eliminated. Therefore another factor in improving the power conversion efficiency is obtained.

In addition, the maximum load power Pomax that can be handled by the conventional power supply circuit shown in FIG. 8, for example, is 200 W, whereas the maximum load power Pomax that can be handled by the power supply circuit according to the present embodiment is raised to 300 W, which is 150% of 200 W. This is made possible because the power supply circuit according to the present embodiment has favorable power conversion efficiency characteristics over a wide load variation range.

As is understood from the description thus far, the effect of eliminating abnormal operation at medium load and thereby enhancing power conversion efficiency in the present embodiment is obtained mainly by setting the coupling coefficient k of the isolated converter transformer PIT to a certain value or lower and appropriately setting the resonant frequencies fo1 and fo2 of the primary side parallel resonant circuit and the secondary side series resonant circuit. The coupling coefficient k of the isolated converter transformer PIT can be set to a certain value or lower by increasing the gap length of the gap G to a predetermined length. In order to set the resonant frequencies fo1 and fo2, the respective capacitances of the primary-side parallel resonant capacitor Cr and the secondary side series resonant capacitor C2, for example, are set in consideration of the respective leakage inductances of the primary winding N1 and the secondary winding N2 of the isolated converter transformer PIT. That is, to obtain the above effect, the present embodiment does not require an addition of particular parts or components. It can be said in this respect that the power supply circuit according to the present embodiment has a circuit board reduced in size and weight.

Figure 6:
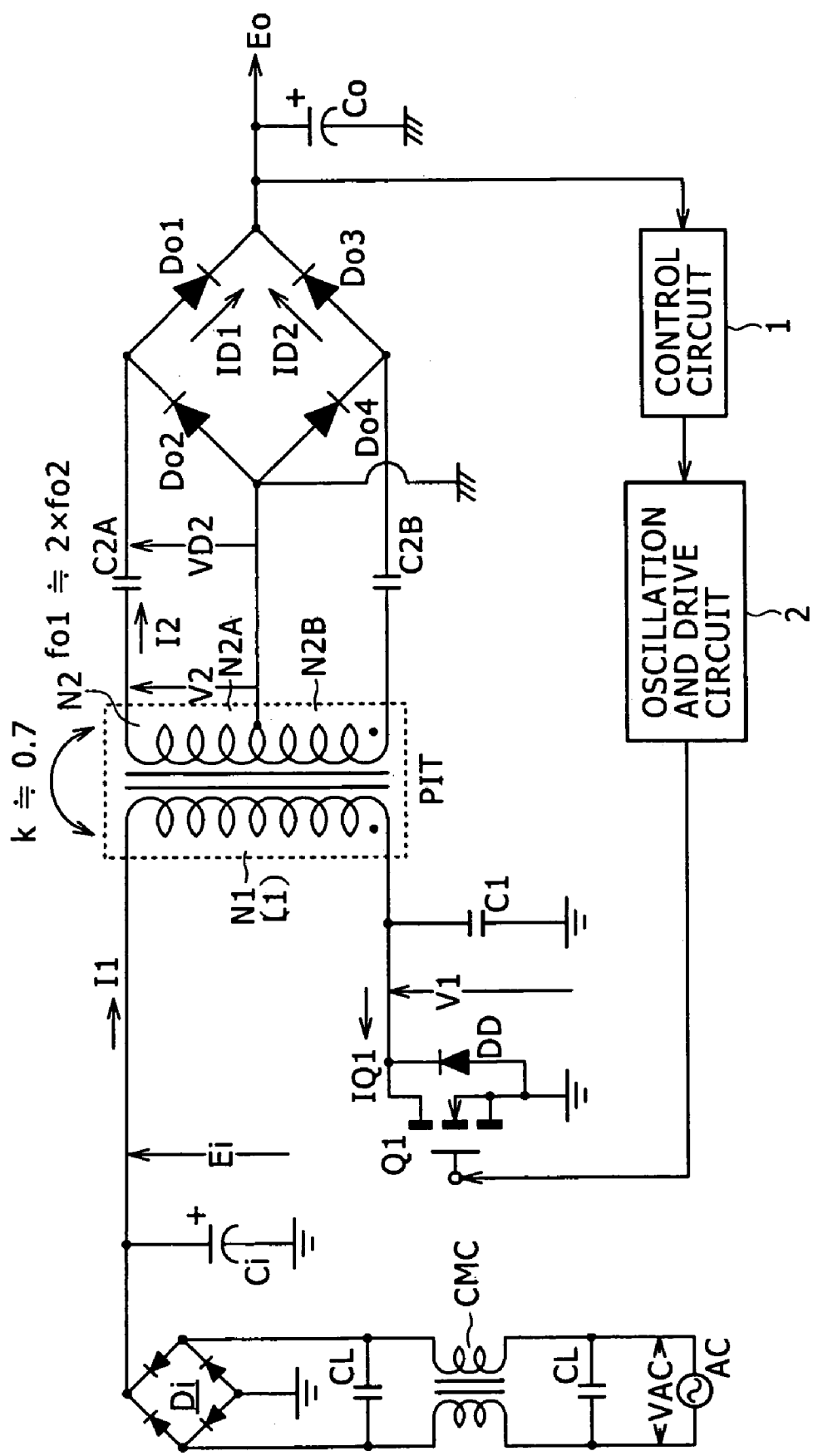
FIG. 6 is a circuit diagram showing an example of configuration of a power supply circuit according to a second embodiment of the present invention.

FIG. 6 shows an example of configuration of a power supply circuit according to a second embodiment. Incidentally, in FIG. 6, the same parts as in FIG. 1 are identified by the same reference numerals, and description thereof will be omitted.

The power supply circuit shown in FIG. 6 has a voltage doubler full-wave rectifier circuit as a secondary side rectifier circuit.

A secondary winding N2 in the voltage doubler full-wave rectifier circuit is provided with a center tap to be divided into two secondary winding parts N2A and N2B with the center tap as a boundary. The same predetermined number of turns is set for the secondary winding parts N2A and N2B.

A secondary side series resonant capacitor C2A is connected in series with an end part on the secondary winding part N2A side of the secondary winding N2. A secondary side series resonant capacitor C2B is connected in series with an end part on the secondary winding part N2B side of the secondary winding N2. Thereby, a first secondary side series resonant circuit is formed by the leakage inductance component of the secondary winding part N2A and the capacitance of the secondary side series resonant capacitor C2A, and a second secondary side series resonant circuit is formed by the leakage inductance component of the secondary winding part N2B and the capacitance of the secondary side series resonant capacitor C2B.

The end part on the secondary winding part N2A side of the secondary winding N2 is connected to a point of connection between the anode of a rectifier diode Do1 and the cathode of a rectifier diode Do2 via the series connection of the secondary side series resonant capacitor C2A. The end part on the secondary winding part N2B side of the secondary winding N2 is connected to a point of connection between the anode of a rectifier diode Do3 and the cathode of a rectifier diode Do4 via the series connection of the secondary side series resonant capacitor C2B.

The respective cathodes of the rectifier diodes Do1 and Do3 are connected to the positive electrode terminal of a smoothing capacitor Co. The negative electrode terminal of the smoothing capacitor Co is connected to a secondary side ground.

A point of connection between the respective anodes of the rectifier diodes Do2 and Do4 and the center tap of the secondary winding N2 are also connected to the secondary side ground.

In the above form of connection, a first voltage doubler half-wave rectifier circuit including the first secondary side series resonant circuit is formed by the secondary winding part N2A, the secondary side series resonant capacitor C2A, the rectifier diodes Do1 and Do2, and the smoothing capacitor Co, and a second voltage doubler half-wave rectifier circuit including the first secondary side series resonant circuit is formed by the secondary winding part N2B, the secondary side series resonant capacitor C2B, the rectifier diodes Do3 and Do4, and the smoothing capacitor Co.

In a half-cycle period of one polarity of an alternating voltage induced in the secondary winding N2, the first voltage doubler half-wave rectifier circuit performs rectifying operation through a rectification current path formed by the secondary winding part N2A, the rectifier diode Do2, the secondary side series resonant capacitor C2A, and the secondary winding part N2A in this order, and charges the secondary side series resonant capacitor C2A by the potential of the alternating voltage (V2) of the secondary winding part N2A. In a half-cycle period of the other polarity of the alternating voltage induced in the secondary winding N2, the first voltage doubler half-wave rectifier circuit performs rectifying operation through a rectification current path formed by the secondary winding part N2A, the secondary side series resonant capacitor C2A, the rectifier diode Do1, the smoothing capacitor Co, and the secondary winding part N2A in this order, and charges the smoothing capacitor Co by a potential obtained by superimposing a voltage across the secondary side series resonant capacitor C2A on the alternating voltage of the secondary winding part N2A.

In the half-cycle period of the other polarity of the alternating voltage induced in the secondary winding N2, the second voltage doubler half-wave rectifier circuit performs rectifying operation through a rectification current path formed by the secondary winding part N2B, the rectifier diode Do4, the secondary side series resonant capacitor C2B, and the secondary winding part N2B in this order, and charges the secondary side series resonant capacitor C2B by the potential of the alternating voltage (equal to the alternating voltage of the secondary winding part N2A at V2) of the secondary winding part N2B. In the half-cycle period of the one polarity of the alternating voltage induced in the secondary winding N2, the second voltage doubler half-wave rectifier circuit performs rectifying operation through a rectification current path formed by the secondary winding part N2B, the secondary side series resonant capacitor C2B, the rectifier diode Do3, the smoothing capacitor Co, and the secondary winding part N2B in this order, and charges the smoothing capacitor Co by a potential obtained by superimposing a voltage across the secondary side series resonant capacitor C2B on the alternating voltage of the secondary winding part N2B.

According to the above-described rectifying operation, the smoothing capacitor Co is charged with a rectified current by the potential obtained by superimposing the voltage across the secondary side series resonant capacitor C2B on the induced voltage of the secondary winding part N2B in the half cycle of the one polarity of the alternating voltage induced in the secondary winding N2, and the smoothing capacitor Co is charged with a rectified current by the potential obtained by superimposing the voltage across the secondary side series resonant capacitor C2A on the induced voltage of the secondary winding part N2A in the half cycle of the other polarity of the alternating voltage induced in the secondary winding N2. Thereby, a secondary side direct-current output voltage Eo as voltage across the smoothing capacitor Co has a level corresponding to twice the level (V2) of the induced voltage of the secondary winding parts N2A and N2B. That is, a voltage doubler full-wave rectifier circuit is obtained.

Principal parts of the power supply circuit of FIG. 6 thus provided with the voltage doubler full-wave rectifier circuit as the secondary side rectifier circuit are selected as follows.

For an isolated converter transformer PIT, an EER-35 core is selected, and the gap G is set to a gap length of 2.2 mm. As for the number T of turns of a primary winding N1, N1=37 T. As for the number T of turns of the secondary winding N2, N2=N2A+N2B=27 T+27 T. Thereby k=0.67 is set as the coupling coefficient k of the isolated converter transformer PIT.

Cr=5600 pF is selected as the capacitance of a primary-side parallel resonant capacitor Cr. The resonant frequency fo1 of a primary side parallel resonant circuit is set to fo1=217 kHz by this capacitance setting of the primary-side parallel resonant capacitor Cr and the leakage inductance L1 of the primary winding N1 obtained by the structure of the isolated converter transformer PIT. C2=0.022° F. is selected as the capacitance of the secondary side series resonant capacitor C2. The resonant frequency fo2 of the secondary side series resonant circuits is set to fo2=104.8 kHz by this capacitance setting of the secondary side series resonant capacitor C2 and the leakage inductance L2 of the secondary winding N2 obtained by the structure of the isolated converter transformer PIT. Also in the second embodiment, in relative terms, a relation of fo1≈2×fo2 is obtained.

Also in this case, as for load power handled by the power supply circuit, maximum load power Pomax=300 W, and minimum load power Pomin=0 W (no load). The rated level of the secondary side direct-current output voltage Eo is 175 V.

Experiments conducted on the thus formed power supply circuit according to the second embodiment provide substantially the same results as operation waveforms as in the waveform charts of FIGS. 3A to 3C representing the operation of the power supply circuit according to the first embodiment. The experiments show that abnormal operation at medium load is eliminated, for example. However, since the secondary side rectifier circuit is the voltage doubler full-wave rectifier circuit, rectified currents ID1 and ID2 flowing in the secondary side rectifier circuit in the respective half-wave periods in one cycle of the alternating voltage of the secondary winding N2 are each 2.5 Ap. The rectified currents ID1 and ID2 in this case have a half-wave sinusoidal waveform because of the resonant operation of the secondary side series resonant circuits (N2A–C2A and N2B–C2B). Also in this case, since one-sidedness of lines of magnetic force is eliminated, the peak levels of the rectified currents ID1 and ID2 are equal to each other.

As for characteristics of variation of AC→DC power conversion efficiency (ηAC→DC) and switching frequency fs (and a period TON) with respect to load variation, substantially the same results as in FIG. 4 showing results of an experiment on the power supply circuit according to the first embodiment are obtained.

Specifically, the variable range of the switching frequency fs which range is necessary to stabilize the secondary side direct-current output voltage Eo at 175 V against load variation from the maximum load power Pomax=300 W to the minimum load power Pomin=0 W is 117.6 kHz to 147.1 kHz, and Δfs=29.5 kHz. With the load variation from the maximum load power Pomax=300 W to the minimum load power Pomin=0 W, a period TON is changed in a range of 5.7 µs to 2.2 µs, and a period TOFF is changed in a range of 2.8 µs to 4.6 µs.

The AC→DC power conversion efficiency (ηAC→DC) is ηAC→DC=91.8% at the maximum load power Pomax=300 W. The AC→DC power conversion efficiency (ηAC→DC) is increased as the load becomes lighter in a range from the maximum load power Pomax=300 W to Po=about 75 W. A maximum value of ηAC→DC=93.8% was measured. At the load power Po=25 W, ηAC→DC=90.0%. Thus, also in the power supply circuit according to the second embodiment, the value of the AC→DC power conversion efficiency (ηAC→DC) is 90% or higher in almost all the range of load power handled by the power supply circuit. An average value of ηAC→DC measured under load conditions at a load power of 100% of the maximum load power, a load power of 75% of the maximum load power, a load power of 50% of the maximum load power, and a load power of 25% of the maximum load power is 92.8%.

Figure 7:
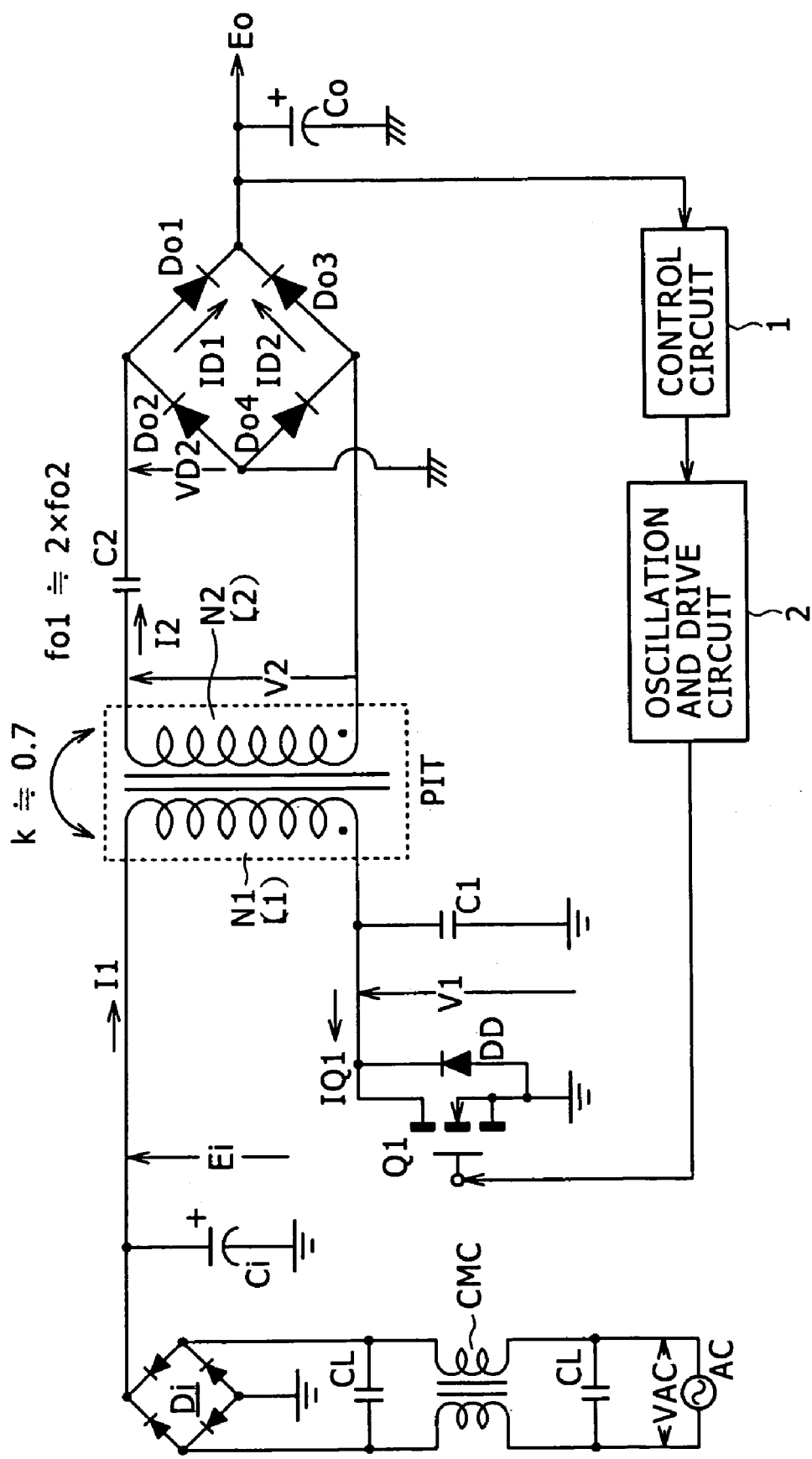
FIG. 7 is a circuit diagram showing an example of configuration of a power supply circuit according to a third embodiment of the present invention.

FIG. 7 is a circuit diagram showing an example of configuration of a power supply circuit according to a third embodiment. Incidentally, in FIG. 7, the same parts as in FIG. 1 and FIG. 6 are identified by the same reference numerals, and description thereof will be omitted.

The power supply circuit shown in FIG. 7 has a bridge full-wave rectifier circuit including a bridge rectifier circuit formed by four rectifier diodes Do1, Do2, Do3, and Do4 as a secondary side rectifier circuit for an isolated converter transformer PIT. This bridge rectifier circuit is formed such that a point of connection between the anode of the rectifier diode Do1 and the cathode of the rectifier diode Do2 is a positive electrode input terminal, a point of connection between the cathode of the rectifier diode Do1 and the cathode of the rectifier diode Do3 is a positive electrode output terminal, a point of connection between the anode of the rectifier diode Do3 and the cathode of the rectifier diode Do4 is a negative electrode input terminal, and a point of connection between the anode of the rectifier diode Do2 and the anode of the rectifier diode Do4 is a negative electrode output terminal.

The positive electrode input terminal of the bridge rectifier circuit is connected to a winding termination end part of a secondary winding N2 via a secondary side series resonant capacitor C2. The positive electrode output terminal is connected to the positive electrode terminal of a smoothing capacitor Co. The negative electrode input terminal is connected to a winding start end part of the secondary winding N2. The negative electrode output terminal is connected to a secondary side ground. The negative electrode terminal of the smoothing capacitor Co is also connected to the secondary side ground.

In a half cycle corresponding to one polarity of the alternating voltage V2 of the secondary winding N2, the rectifier diode Do1 and the rectifier diode Do4 in the thus formed secondary side rectifier circuit conduct to perform rectification and charge the smoothing capacitor Co with a rectified current ID1. In the other half cycle of the secondary winding voltage V2 in which period the winding start side of the secondary winding N2 is at a positive potential, the rectifier diode Do2 and the rectifier diode Do3 conduct to perform rectification and charge the smoothing capacitor Co with a rectified current ID2. Thereby a secondary side direct-current output voltage Eo having a level corresponding to once the level of the voltage (V2) induced in the secondary winding N2 is generated as a voltage across the smoothing capacitor Co.

A series connection circuit of the secondary winding N2 and the secondary side series resonant capacitor C2 is inserted in a rectification current path formed in correspondence with each of the positive polarity and the negative polarity of the alternating voltage V2 of the secondary winding N2. That is, also in this case, a secondary side series resonant circuit is formed on a secondary side by the leakage inductance L2 of the secondary winding N2 and the capacitance of the secondary side series resonant capacitor C2. The secondary side series resonant circuit performs resonant operation according to the rectifying operation of the secondary side rectifier circuit.

Principal parts of the power supply circuit of FIG. 7 employing such a circuit configuration are selected as follows.

For the isolated converter transformer PIT, an EER-35 core is selected, and the gap G is set to a gap length of 2.2 mm. As for the number T of turns of a primary winding N1, N1=37 T. As for the number T of turns of the secondary winding N2, N2=54 T. Thereby k=0.67 is set as the coupling coefficient k of the isolated converter transformer PIT.

Cr=7500 pF is selected as the capacitance of a primary-side parallel resonant capacitor Cr. The resonant frequency fo1 of a primary side parallel resonant circuit is set to fo1=217 kHz by this capacitance setting of the primary-side parallel resonant capacitor Cr and the leakage inductance L1 of the primary winding N1 obtained by the structure of the isolated converter transformer PIT. C2=0.012° F. is selected as the capacitance of the secondary side series resonant capacitor C2. The resonant frequency fo2 of the secondary side series resonant circuit is set to fo2=100.3 kHz by this capacitance setting of the secondary side series resonant capacitor C2 and the leakage inductance L2 of the secondary winding N2 obtained by the structure of the isolated converter transformer PIT. Also in the third embodiment, in relative terms, a relation of fo1≈2×fo2 is obtained.

As for load power handled by the power supply circuit, maximum load power Pomax=300 W, and minimum load power Pomin=0 W (no load). The secondary side direct-current output voltage Eo has a rated level of 175 V.

Results of experiments on the power supply circuit according to the third embodiment are also substantially the same results as in the waveform charts of FIGS. 3A to 3C. That is, it is confirmed that abnormal operation at medium load is eliminated. Also in this case, the rectified currents ID1 and ID2 flowing in the secondary side rectifier circuit have a half-wave sinusoidal waveform because of the resonant operation of the secondary side series resonant circuit. The peak levels of the rectified currents ID1 and ID2 in this case are each 2.6 Ap, and thus equal to each other, indicating that one-sidedness of lines of magnetic force is eliminated.

As for characteristics of variation of AC→DC power conversion efficiency (ηAC→DC) and switching frequency fs (and a period TON) with respect to load variation, substantially the same results as in FIG. 4 showing results of an experiment on the power supply circuit according to the first embodiment are obtained.

Specifically, the variable range of the switching frequency fs which range is necessary to stabilize the secondary side direct-current output voltage Eo at 175 V against load variation from the maximum load power Pomax=300 W to the minimum load power Pomin=0 W is 114.9 kHz to 137 kHz, and Δfs=22.1 kHz. With the load variation from the maximum load power Pomax=300 W to the minimum load power Pomin=0 W, a period TON is changed in a range of 5.6 μs to 2.2 μs, and a period TOFF is changed in a range of 3.1 μs to 5.1 μs.

The AC→DC power conversion efficiency (ηAC→DC) is QAC→DC=91.8% at the maximum load power Pomax=300 W. The AC→DC power conversion efficiency (ηAC→DC) is increased as the load becomes lighter in a range from the maximum load power Pomax=300 W to Po=about 75 W. A maximum value of ηAC→DC=93.5% was measured. At the load power Po=25 W, ηAC→DC=90.0%. Thus, also in the power supply circuit according to the third embodiment, the value of the AC→DC power conversion efficiency ($\eta$AC→DC) is 90% or higher in almost all the range of load power handled by the power supply circuit. An average value of nAC→DC measured under load conditions at a load power of 100% of the maximum load power, a load power of 75% of the maximum load power, a load power of 50% of the maximum load power, and a load power of 25% of the maximum load power is 92.5%.

It is to be noted that the present invention is not limited to the configurations shown as the foregoing embodiments. For example, different configurations are conceivable for details of the circuit configuration of the primary side voltage resonant converter and the configuration of the secondary side rectifier circuit including the secondary side series resonant circuit.

In addition, a device other than the MOS-FET may be selected as the switching device. Further, while the foregoing embodiments include an externally excited switching converter, the present invention is applicable to cases where the switching converter is formed as a self-excited switching converter.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit, comprising:
   rectifying and smoothing means for obtaining a direct-current input voltage by rectifying and smoothing an alternating input voltage;
   switching means including a switching device supplied with the direct-current input voltage and performing a switching operation;
   switching-driving means for driving the switching device to perform the switching operation;
   an isolated converter transformer having a primary winding on a primary side and a secondary winding on a secondary side, the primary winding being supplied with a switching output obtained by the switching operation of the switching means and the secondary winding having an alternating voltage induced therein by the primary winding;
   a primary side parallel resonant circuit including a leakage inductance component of the primary winding and a capacitance of a primary side parallel resonant capacitor, the primary side parallel resonant circuit converting operation of the switching means into a voltage resonant type operation;
   a secondary side series resonant circuit including a leakage inductance component of the secondary winding and a capacitance of a secondary side series resonant capacitor connected in series with the secondary winding;
   secondary side direct-current output voltage generating means for performing a rectifying operation on the alternating voltage induced in the secondary winding and input to the secondary side direct-current output voltage generating means to produce a rectified output, and for smoothing the rectified output using a secondary side smoothing capacitor to generate a secondary side direct-current output voltage; and
   constant-voltage control means for performing constant voltage control on the secondary side direct-current output voltage by controlling the switching-driving means according to a level of the secondary side direct-current output voltage to adjust the switching frequency of the switching means, wherein
   a coupling coefficient between the primary side and the secondary side of the isolated converter transformer is set at a loose coupling where an interaction between the primary side parallel resonant circuit and the secondary side series resonant circuit is weakened, and
   a resonant frequency of the primary side parallel resonant circuit is set to approximately two times of a resonant frequency of the secondary side series resonant circuit so as to obtain proper zero voltage switching over an entire range of load power.

2. The switching power supply circuit as claimed in claim 1,
   wherein the secondary side direct-current output voltage generating means includes a voltage doubler half-wave rectifier circuit for charging one of the secondary side series resonant capacitor and the secondary side smoothing capacitor in each half cycle of the alternating voltage induced in the secondary winding, and for generating the secondary side direct-current output voltage having a level corresponding to twice the level of the alternating voltage.

3. The switching power supply circuit as claimed in claim 1, further comprising:
   a tap dividing the secondary winding; and
   a secondary side series resonant capacitor connected in series with each of end parts of the divided secondary winding;
   wherein the secondary side direct-current output voltage generating means includes a voltage doubler full-wave rectifier circuit for charging one of the secondary side series resonant capacitor and the secondary side smoothing capacitor in each half cycle of the alternating voltage induced in the secondary winding, and for generating the secondary side direct-current output voltage having a level corresponding to twice the level of the alternating voltage.

4. The switching power supply circuit as claimed in claim 1,
   wherein the secondary side direct-current output voltage generating means includes a bridge rectifier circuit, and performs a full-wave rectifier operation.

5. A switching power supply circuit, comprising:
   a rectifying and smoothing circuit operable to receive an alternating input voltage and to rectify and smooth the alternating input voltage to generate a direct-current input voltage;
   a switching circuit including a switching device operable to receive the direct-current input voltage and to perform a switching operation resulting in a switching output;
   a switching driving unit operable to drive the switching device to perform the switching operation;
   an isolated converter transformer having at least a primary winding on a primary side and a secondary winding on a secondary side, the primary winding being supplied with the switching output of the switching operation, and the secondary winding having an alternating voltage induced therein by the primary winding;
   a primary side parallel resonant circuit including a leakage inductance component of the primary winding and a capacitance of a primary side parallel resonant capacitor, the primary side parallel resonant circuit converting operation of the switching circuit into a voltage resonant-type operation;
   a secondary side series resonant circuit including a leakage inductance component of the secondary winding and a capacitance of a secondary side series resonant capacitor connected in series with the secondary winding;

a secondary side direct-current output voltage generating circuit operable to perform a rectifying operation on the alternating voltage induced in the secondary winding and input to the secondary side direct-current output voltage generating circuit to produce a rectified output, and to smooth the rectified output using a secondary side smoothing capacitor to generate a secondary side direct-current output voltage; and a constant-voltage control unit operable to perform constant voltage control on the secondary side direct-current output voltage by controlling the switching-driving unit according to a level of the secondary side direct-current output voltage to adjust the switching frequency of the switching circuit, wherein a coupling coefficient between the primary side and the secondary side of the isolated converter transformer is set at a loose coupling where an interaction between the primary side parallel resonant circuit and the secondary side series resonant circuit is weakened, and a resonant frequency of the primary side parallel resonant circuit is set to approximately two times of a resonant frequency of the secondary side series resonant circuit so as to obtain proper zero voltage switching over an entire range of load power.

* * * * *